United States Patent [19]
Miyazaki et al.

[11] Patent Number: 5,361,197
[45] Date of Patent: Nov. 1, 1994

[54] METHOD AND APPARATUS FOR CONTROLLING AN INVERTER GENERATING A PLURALITY OF PHASE VOLTAGES

[75] Inventors: Satoshi Miyazaki, Kanagawa; Lazhar Ben-Brahim; Ryoichi Kurosawa, both of Tokyo, all of Japan

[73] Assignee: Kabushiki Kaisha Toshiba, Kawasaki, Japan

[21] Appl. No.: 4,899

[22] Filed: Jan. 21, 1993

[30] Foreign Application Priority Data

Jan. 24, 1992 [JP] Japan ................................. 4-011110
Jun. 2, 1992 [JP] Japan ................................. 4-141233
Sep. 14, 1992 [JP] Japan ................................. 4-244428

[51] Int. Cl.⁵ ........................................... H02M 3/24
[52] U.S. Cl. .................................................. 363/98
[58] Field of Search ............... 363/95, 96, 98, 132, 363/136

[56] References Cited

U.S. PATENT DOCUMENTS

| | | | |
|---|---|---|---|
| 4,961,129 | 10/1990 | Shekhawat | 363/98 |
| 5,120,986 | 6/1992 | Shekhawat | 363/98 |
| 5,130,917 | 7/1992 | Shekhawat | 363/56 |
| 5,274,542 | 12/1993 | Tanaka et al. | 363/96 |

Primary Examiner—Steven L. Stephan
Assistant Examiner—Matthew Nguyen
Attorney, Agent, or Firm—Foley & Lardner

[57] ABSTRACT

An inverter control apparatus comprises a controller, a mode decision circuit and a voltage reference conversion circuit. The mode decision circuit determines one of three kinds of modes which may be used to control the inverter, namely, a normal mode, a rectangle mode and zero correction mode selected according to values and polarities of multi-phase voltage reference signals. The voltage reference conversion circuit corrects the voltage reference signals according to the determined mode in the mode decision circuit. In the case of the normal mode, the mode decision circuit outputs the previous voltage reference signal V* without change as the new or corrected voltage reference signals. In the case of the rectangle mode, the circuit fixes the voltage reference signal V* having the greatest value of the three phase (U-phase, V-phase and W-phase) to a minimum voltage reference $V_{min}$ which is of opposite polarity to the selected greatest value signal, or, in another embodiment, to a zero value. Further the circuit converts the others voltage reference signals to corrected voltage reference signals without change of line voltage. The control circuit permits control of the inverter even in a regime of low reference voltage which would otherwise result in an uncontrolled region of the inverter.

11 Claims, 31 Drawing Sheets

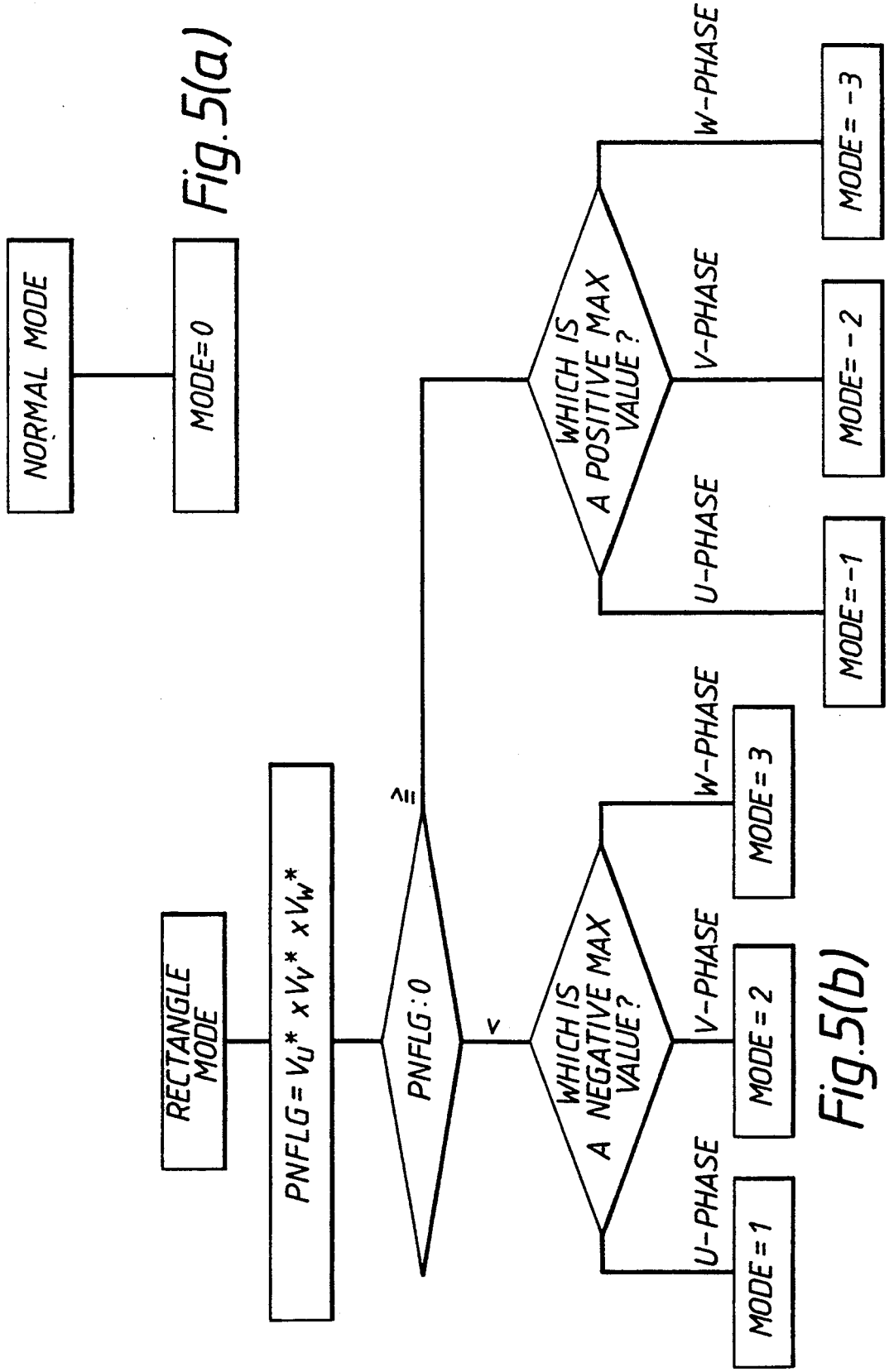

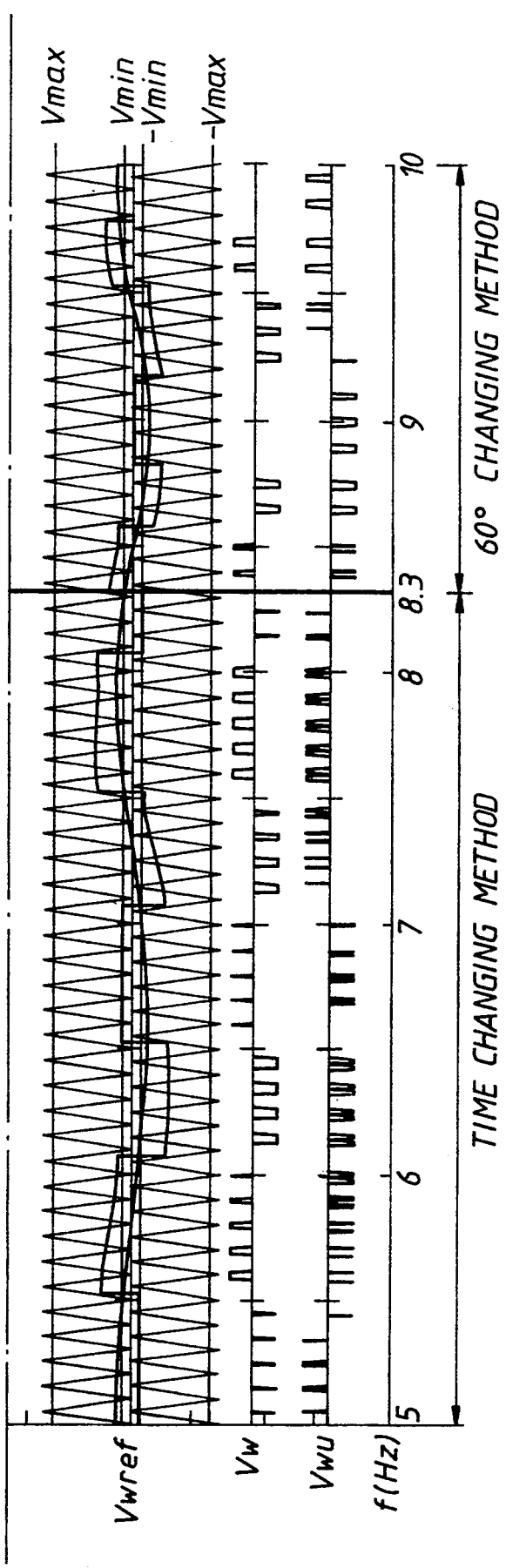

METHOD AND APPARATUS FOR CONTROLLING AN INVERTER GENERATING A PLURALITY OF PHASE VOLTAGES

BACKGROUND OF THE INVENTION

1. Field of the Invention

The invention relates to a control apparatus applied to a pulse width modulation (PWM) control inverter for converting DC power into AC power, a PWM control converter for converting AC power into DC power, and the like.

2. Description of the Related Art

For general background into the subject matter of the invention, reference is made to co-pending application Ser. No. 07/841,816, filed Feb. 26, 1992 entitled "Control Device of Neutral Point Clamped Power Inverter Apparatus," incorporated herein by reference.

A pulse width modulation control inverter uses self-quenching type switching elements such as gate turn-off (GTO) thyristors.

As shown in FIG. 1, the inverter control apparatus comprises a controller 300, a comparator 301 and a pulse correction circuit 302. The controller 300 outputs a voltage reference signals $V^*$. The comparator 301 compares the voltage reference signals $V^*$ and carrier signals $V_{CP}$ and $V_{CN}$, and outputs output signals $V_{CMP}$. The pulse correction circuit 302 corrects the output signals $V_{CMP}$ from the comparator 301, and outputs gate signals $V_G$. These gate signals are used to control the switching elements, e.g., GTOs in the inverter as is well known in the prior art, e.g., FIG. 13.

As shown in FIG. 2, the pulse correction circuit 302 operates to correct the output signal $V_{CMP}$ when the width of the output signal $V_{CMP}$ is equal to or less than a minimum ON pulse width $T_O$ (namely, the absolute value of the voltage reference signal $V^*$ is equal to or less than a minimum voltage reference $\pm V_{min}$). As a result, the minimum width of the gate signal $V_G$ is not less than the minimum ON pulse width $T_O$.

However, the control apparatus cannot control the output voltage at the low voltage regime which thus may also be called an uncontrolled regime. The low voltage regime means a region in which the width of the output signals $V_{CMP}$ is equal to or less than the minimum ON pulse width $T_O$. To avoid using a pulse less than the minimum ON time, the prior art teaches modification of the comparator signals $V_{CMP}$ so as to produce the constant pulse width gate signals $V_G$ in the uncontrolled regime. However, using a fixed width gate pulse means that the width of the phase voltage of the inverter may not be variably controlled as would be desirable so as to control the inverter throughout the entire voltage range, including the low voltage regime. The control system of the prior art is thus unstable and difficult to control accurately due to the uncontrollable region.

SUMMARY OF THE INVENTION

It is an object of the present invention to provide a method and apparatus for controlling an inverter, which can output a sine-wave voltage for all output voltages about the line voltage and does not have the disadvantage of the prior art in producing an uncontrolled area.

In accordance with one embodiment of the invention, there is provided a method of controlling an inverter generating a plurality of phase voltages and a corresponding plurality of line voltages defined as the differences between the phase voltages. The method comprises the steps of: (a) generating voltage reference signals having waveforms with a plural phases; (b) determining one of (1) a normal mode, (2) a rectangle mode and (3) a zero correction mode of operation of the inverter in response to values and polarities of the voltage reference signals; (c) using the voltage references during the normal mode as a reference value for controlling the inverter; and (d) in at least one of the determined rectangle and zero correction modes, converting the voltage reference signals to converted voltage reference signals in accordance with a preset algorithm such that each phase voltage based on the converted voltage reference signals has a controlled pulse width greater than or equal to a predetermined minimum width and such that the resulting line voltages do not change when compared to the line voltages generated using the voltage reference signals.

In accordance with another aspect of the invention, there is provided a method of controlling an inverter wherein the inverter generates a plurality of phase voltages and a corresponding plurality of line voltages. The line voltages are defined as the differences between the phase voltages. The method involves a) generating voltage references signals having waveforms wherein each waveform has a different phase; b) selecting the waveform of the voltage reference signal which has the most positive value during a preset interval (time or phase); c) converting the selected waveform to a phase of a converted voltage reference signal which has one of (1) a preset minimum value which is negative and (2) a preset value which is zero; d) converting the other waveforms of the voltage reference signals to converted voltage reference signals of the inverter such that the resulting line voltages do not change when compared to the line voltages generated using the voltage reference signals; e) selecting the waveform of the voltage reference signal which has the most negative value during the preset interval; f) converting the selected waveform to a waveform of a converted voltage reference signal which has one of (1) a preset minimum value which is positive and (2) a preset value which is zero; g) converting the other waveforms of the voltage reference signals to converted voltage reference signals of the inverter such that the resulting line voltages do not change when compared to the line voltages generated using the voltage reference signals; and h) switching alternately between steps b)-d) and steps e)-g) to control the inverter.

According to yet another aspect of the invention, there is provided an inverter control apparatus for an inverter generating a plurality of phase voltages and a corresponding plurality of line voltages defined as the differences between the phase voltages. The control apparatus comprises a mode decision device and a voltage reference device. The mode decision device determines one of (1) a normal mode, (2) a rectangle mode and (3) a zero correction mode in response to values and polarities of voltage reference signals having waveforms with plural phases. The voltage reference conversion device is operative in normal, rectangle and zero correction modes. In the normal mode the conversion device outputs the voltage reference signals as converted voltage reference signals which are identical to the voltage reference signals. In the rectangle and zero correction modes the conversion device outputs corrected voltage references signals in response to the voltage reference signals in accordance with an algorithm such that the resulting line voltages do not change when compared to the line voltages generated using the voltage reference signals.

The invention may be further defined with respect to another aspect as a control apparatus for controlling a neutral point clamped three-phase inverter. The inverter has switching elements and generates a plurality of phase voltages and a corresponding plurality of line voltages. The control apparatus comprises a generator and a voltage reference conversion device. The generator generates voltage reference signals having plural phases. The voltage reference conversion device is operative for: (1) converting the voltage reference signals to converted voltage reference signals, the conversion device fixing the value of one of a corrected voltage reference signal to one of a positive minimum value or a negative minimum value when the width of any of the plurality of phase voltages becomes equal to a minimum value corresponding to a minimum ON pulse width of the switching elements; and (2) converting the other of the voltage references signals such that the resulting line voltages do not change when compared to the line voltages generated using the voltage reference signals.

In yet another aspect of the invention, an inverter control apparatus is provided for controlling a neutral point clamped three-phase inverter. The inverter generates a plurality of phase voltages and a corresponding plurality of line voltages. The control apparatus comprises a device for generating voltage reference signals having plural phases, and a first voltage reference conversion device for converting all phases of the voltage reference signals to converted voltage reference signals, all having a positive polarity, such that the resulting line voltages generated from the converted voltage reference signals do not change when compared to the line voltages generated using the voltage reference signals. The apparatus also includes second voltage reference conversion device for converting all phases of the voltage reference signals to converted voltage reference signals, all having a negative polarity, such that the resulting line voltages generated from the converted voltage reference signals do not change when compared to the line voltages generated using the voltage reference signals; and a switching device for alternately controlling the inverter using the first and second voltage reference conversion means.

Still in a further aspect, the invention may be defined as an inverter control apparatus for controlling a neutral point clamped three-phase inverter, the inverter generating three phase voltages and three corresponding line voltages. The control apparatus comprises: a) a generator which generates voltage reference signals having a plurality of waveforms each having a different phase; b) a device for selecting the phase of the voltage reference signal which has the most positive value waveform during a preset interval (of time or phase); c) a device for converting the selected phase to a phase of a converted voltage reference signal which has a preset positive maximum value waveform; d) a device for converting the other phases of the voltage reference signals to converted voltage reference signals of the inverter such that the resulting line voltages do not change when compared to the line voltages generated using the voltage reference signals; e) a device for selecting the phase of the voltage reference signal which has the most negative value waveform during the preset interval; f) a device for converting the selected phase to a phase of a converted voltage reference signal which has a preset negative maximum value waveform; g) a device for converting the other phases of the voltage reference signals to converted voltage reference signals of the inverter such that the resulting line voltages do not change when compared to the line voltages generated using the voltage reference signals; and h) a device for switching alternately between activation of elements b)-d) and elements e)-g) to control the inverter.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

Figure 14:
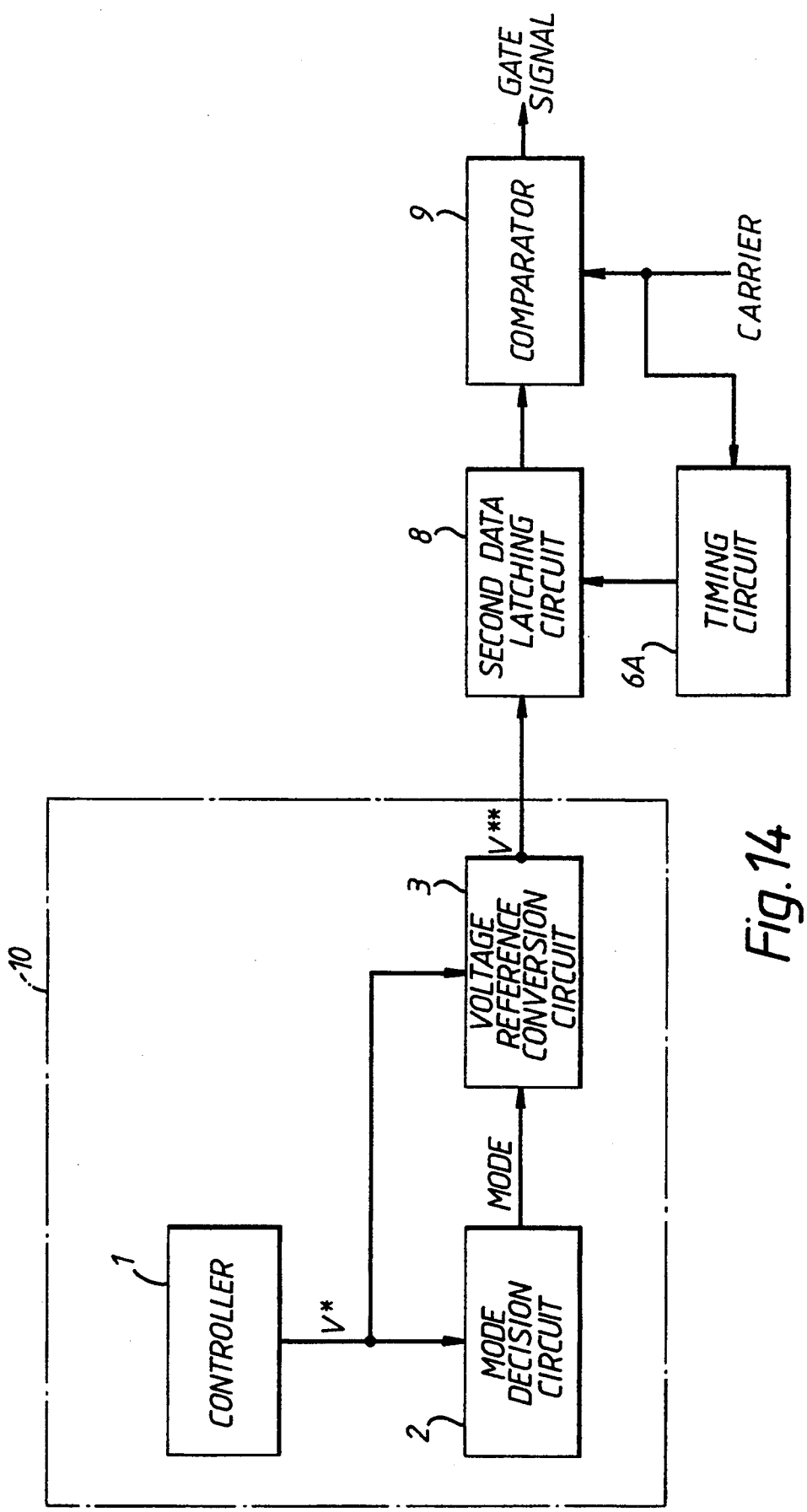
Figure 15:
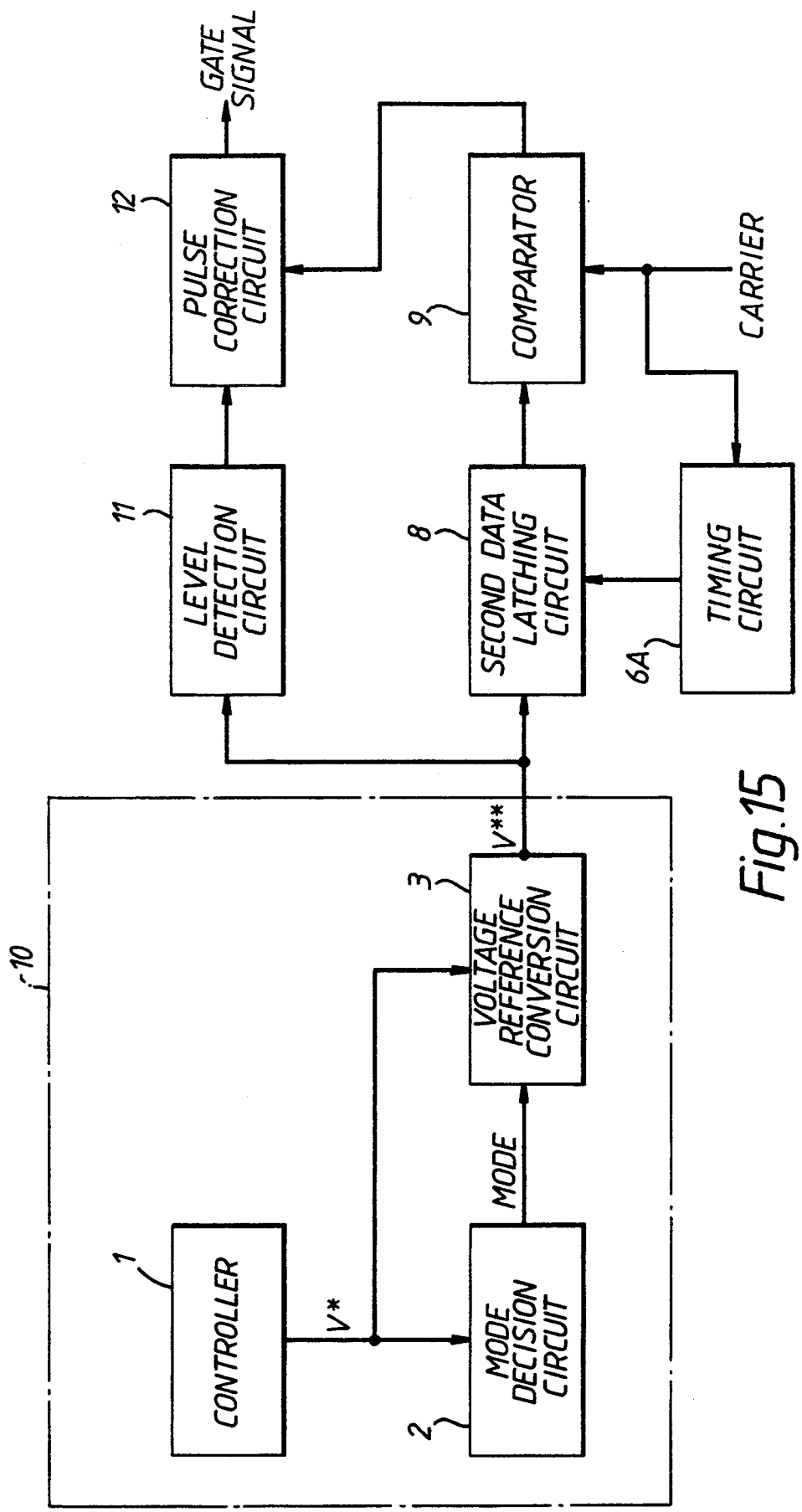
Figure 16:
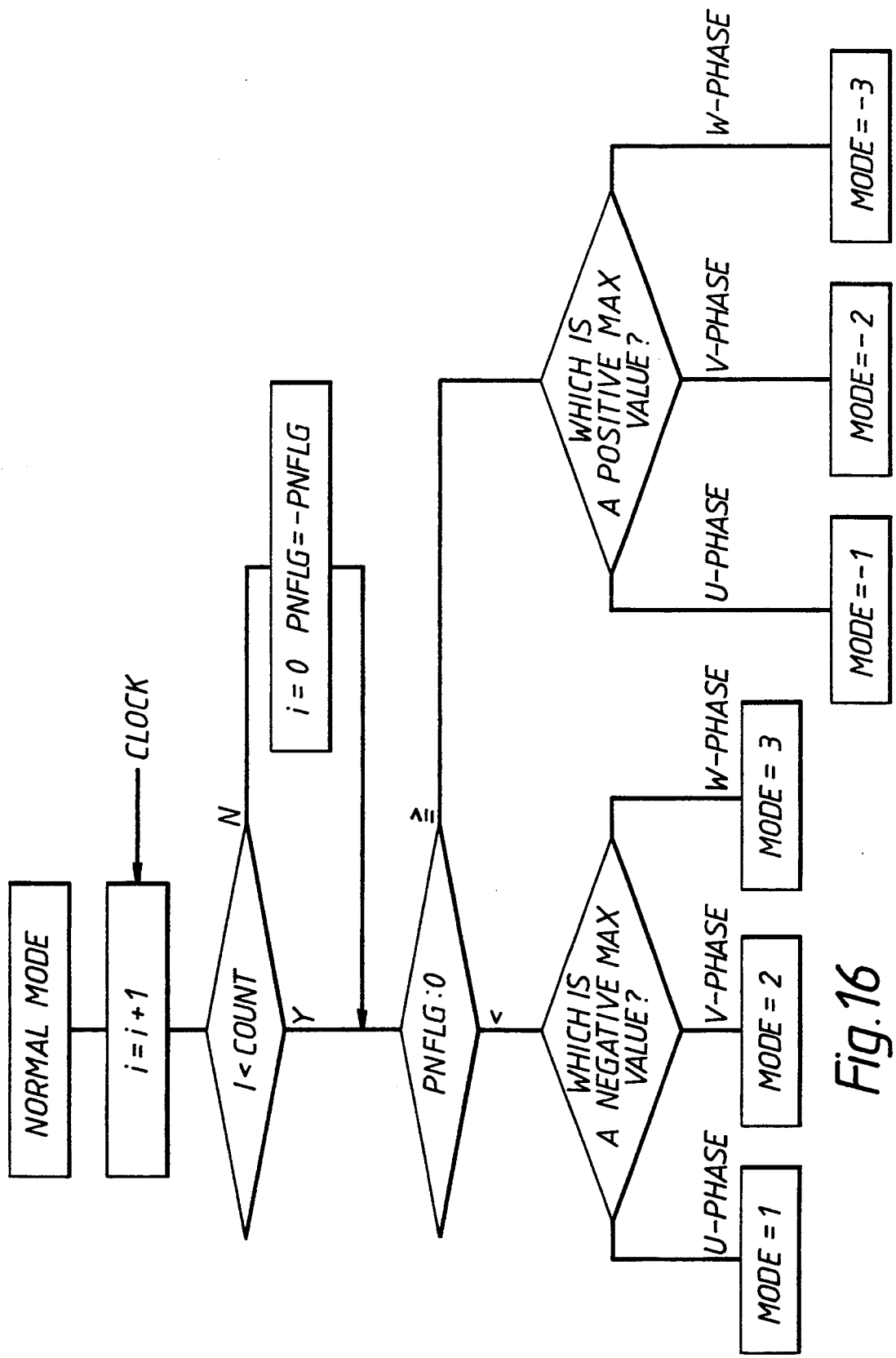
Figure 17:
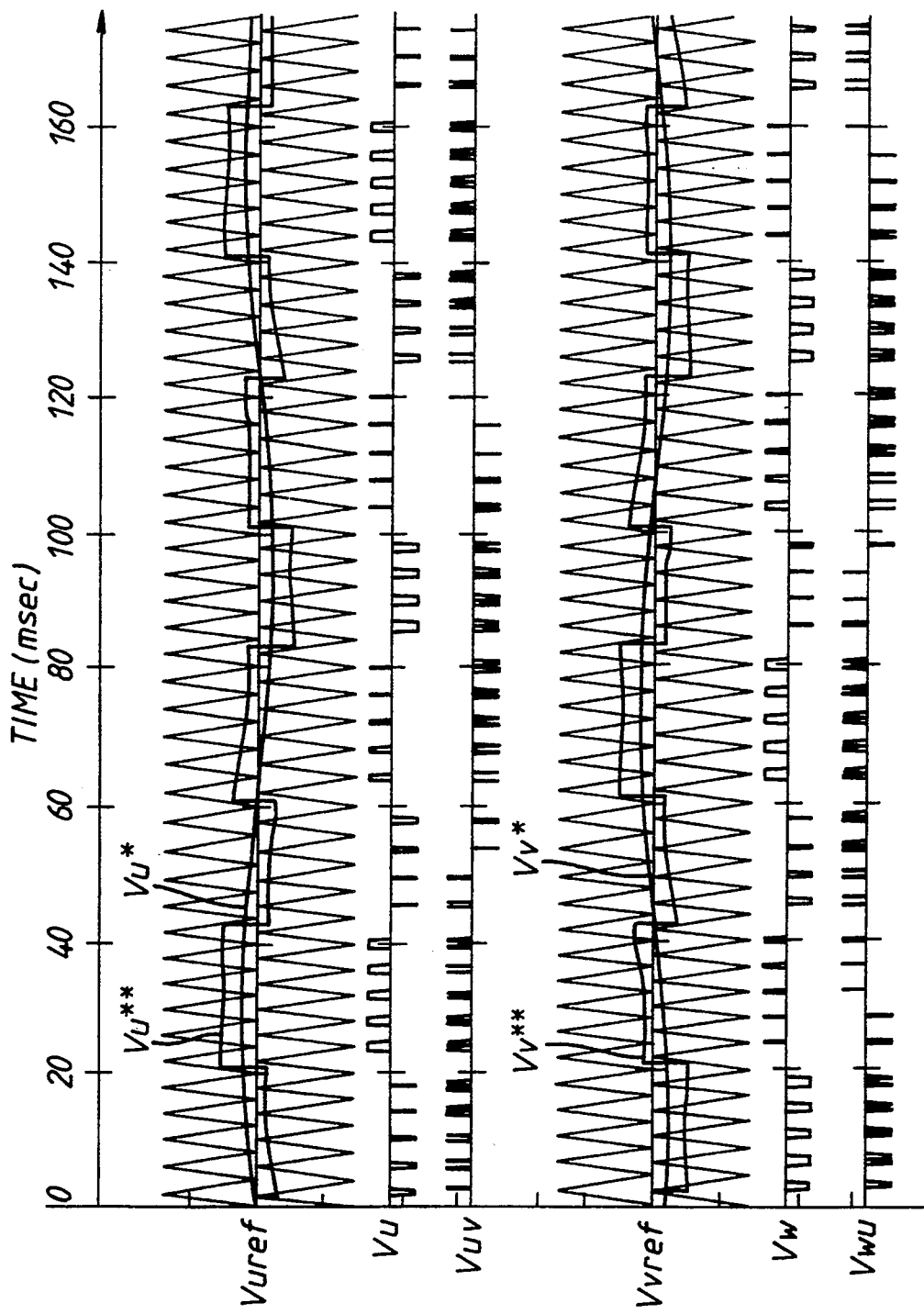
Figure 17:
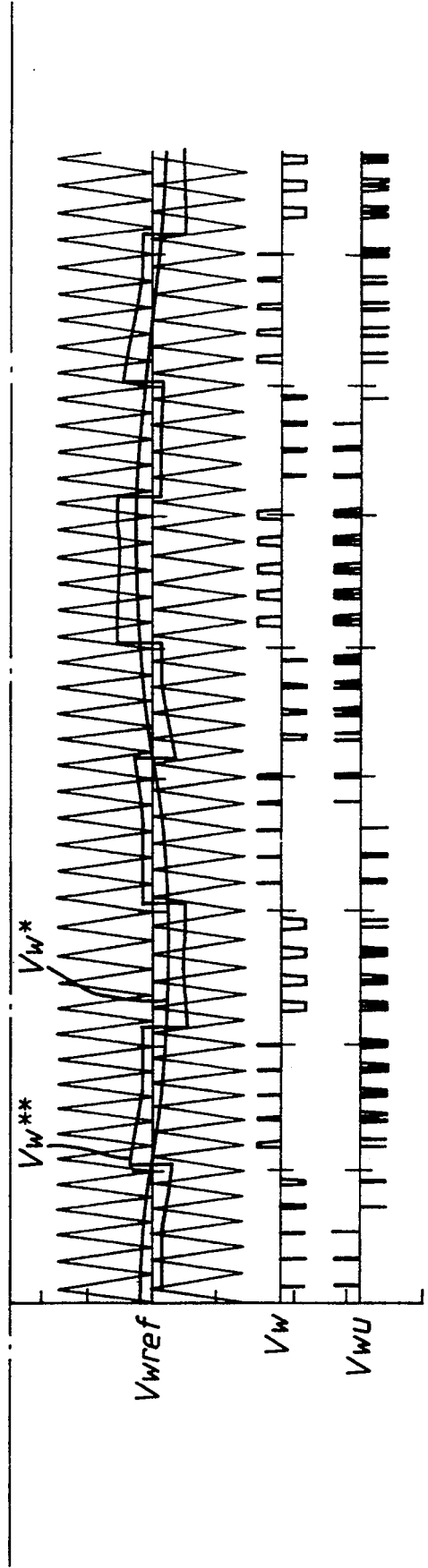
Figure 18:
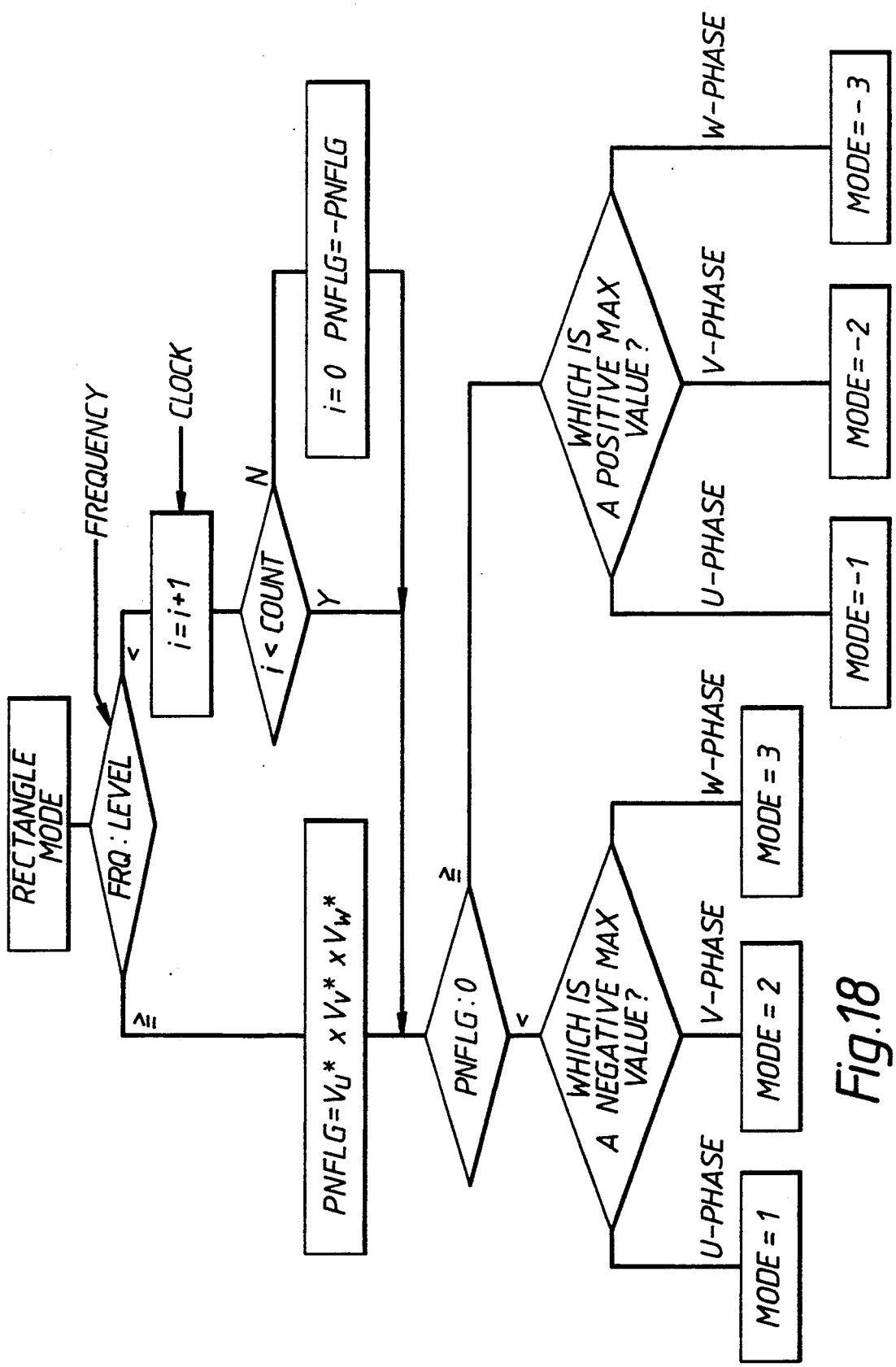
Figure 19:
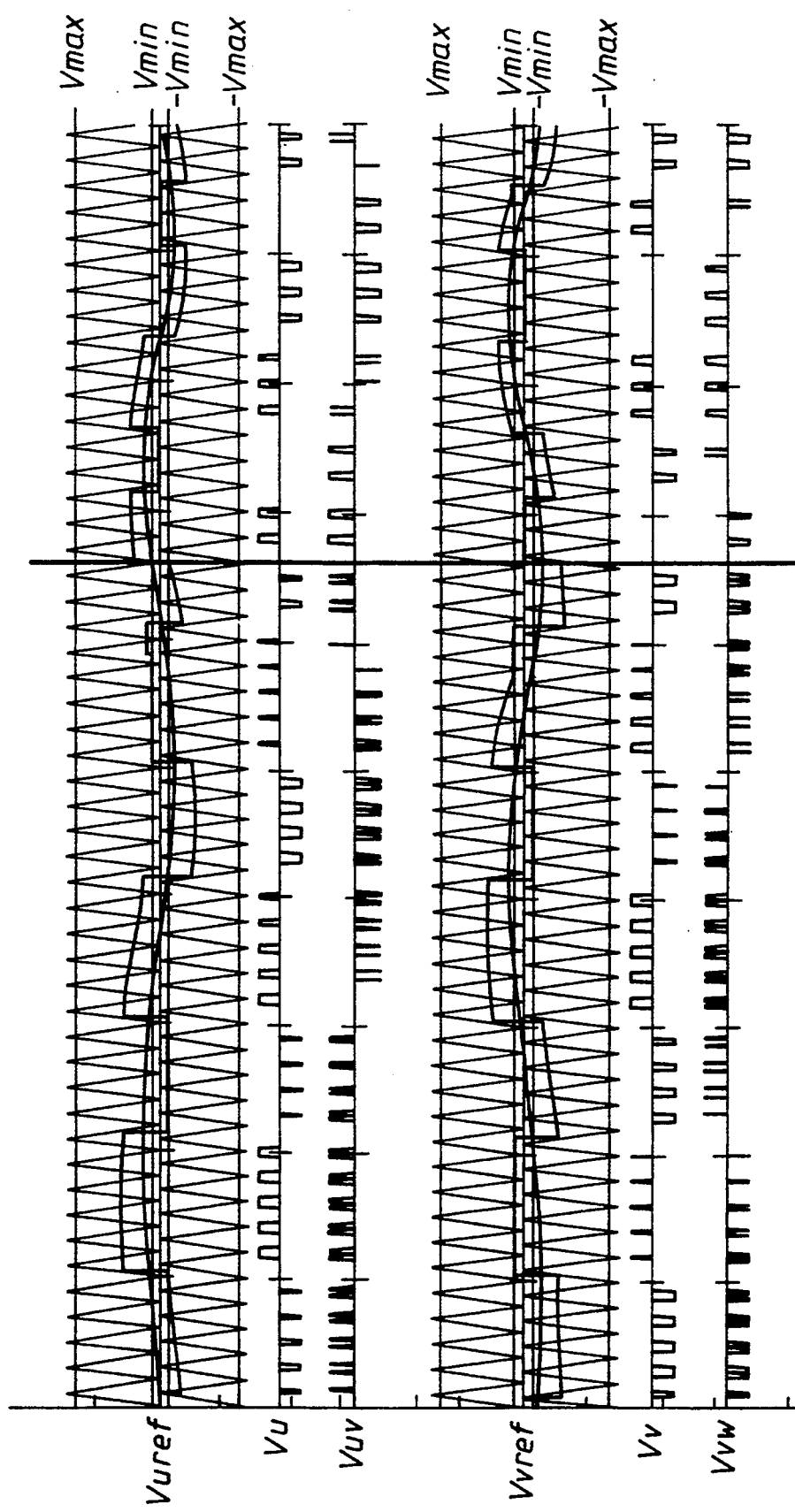
Figure 20:
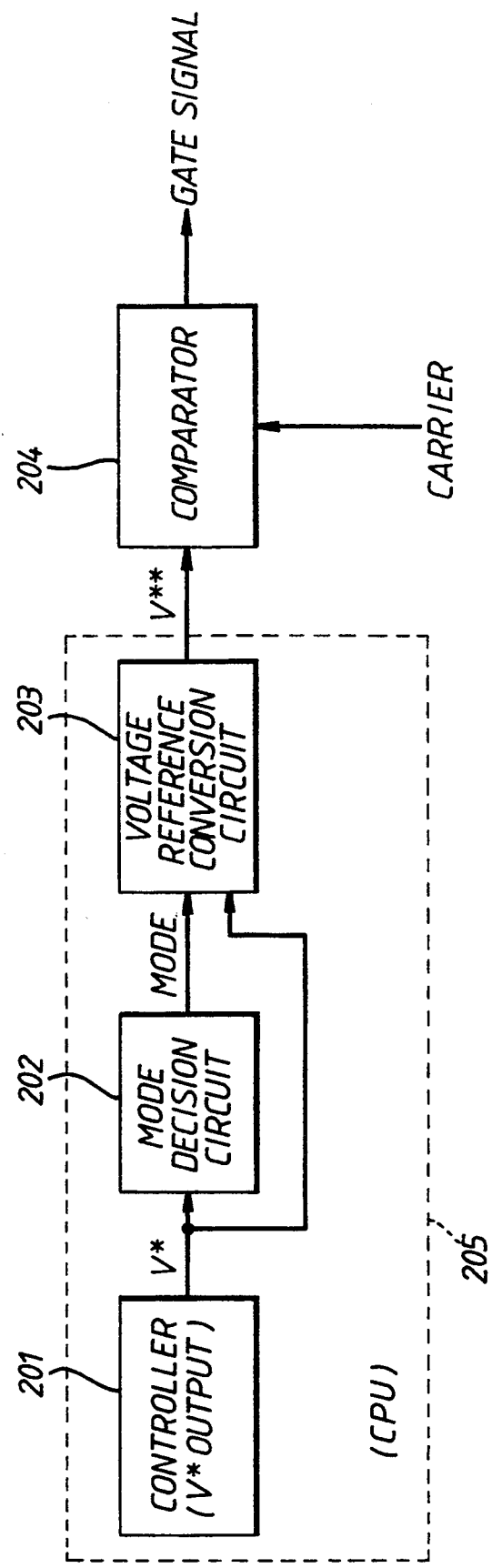
Figure 21:
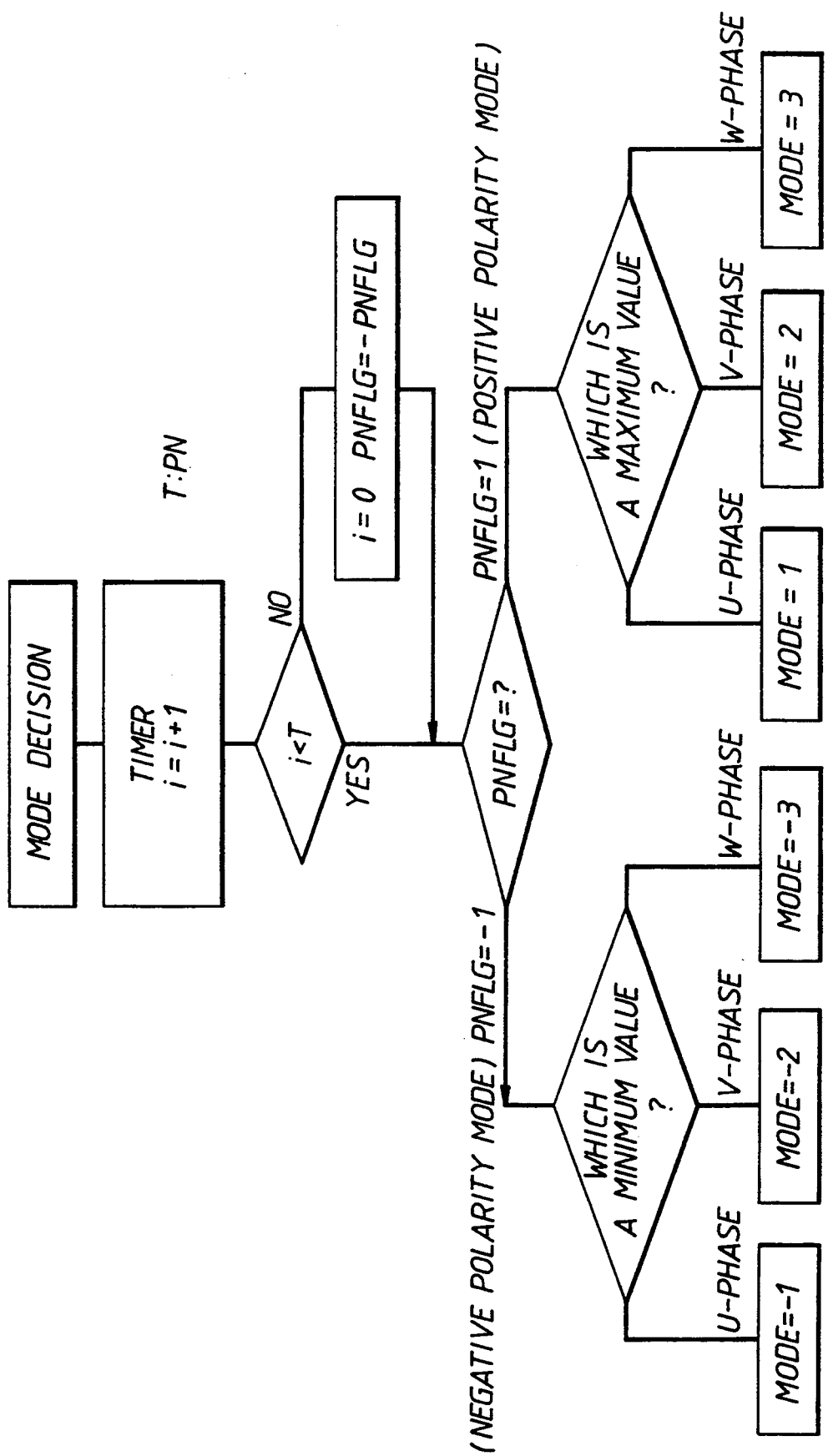
Figure 22:
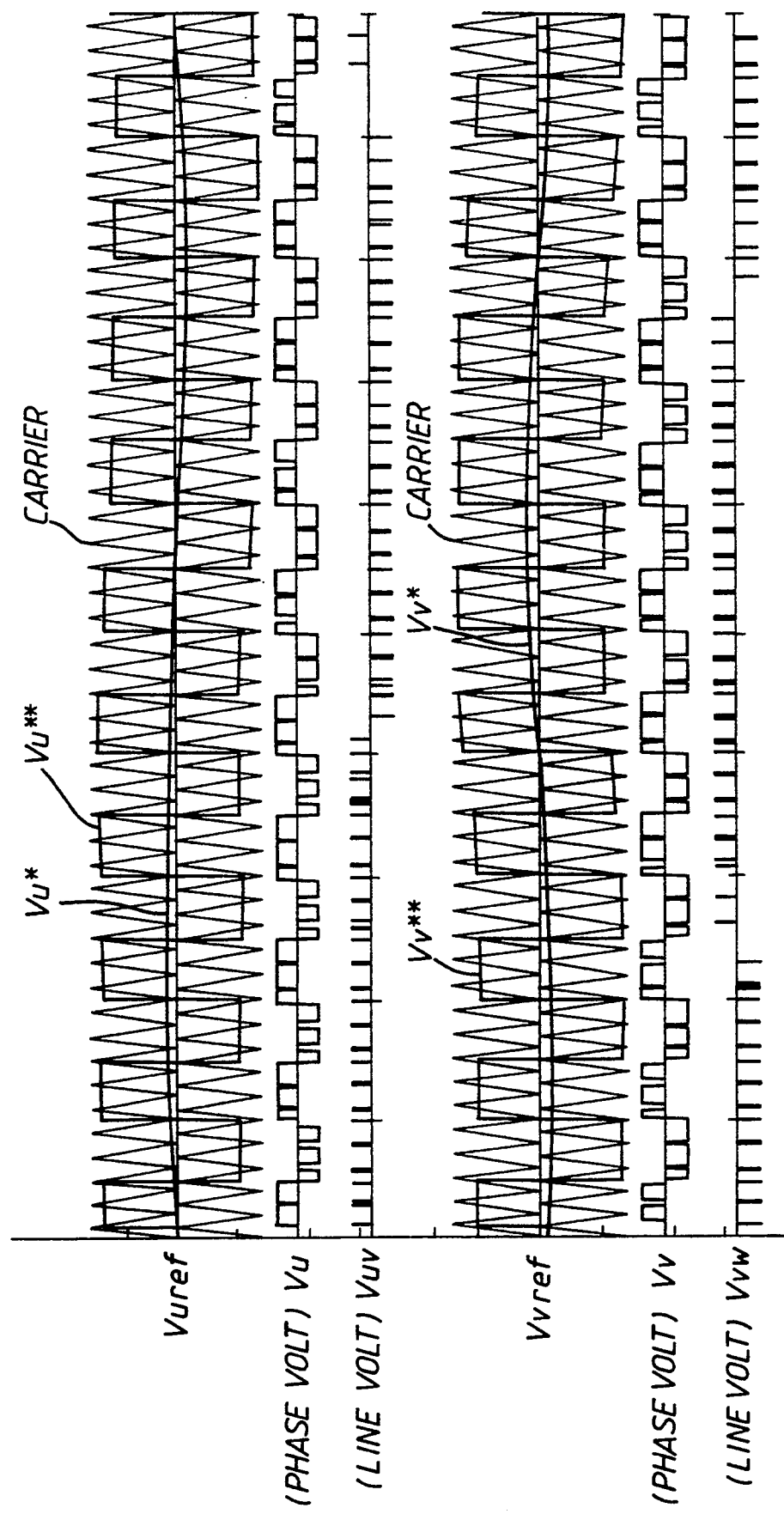
Figure 22:
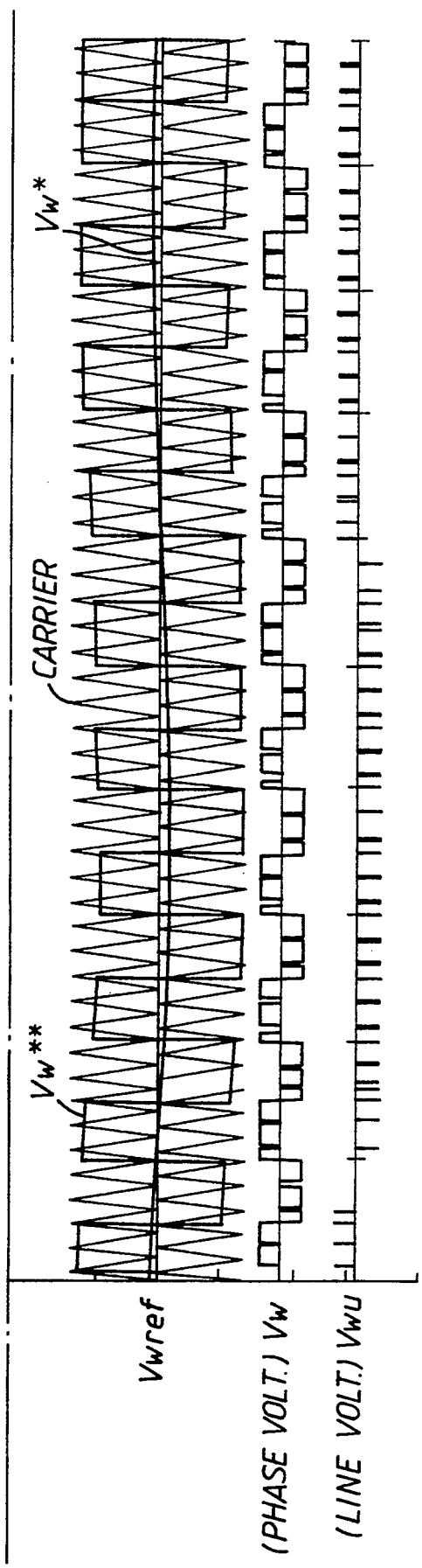
Figure 23:
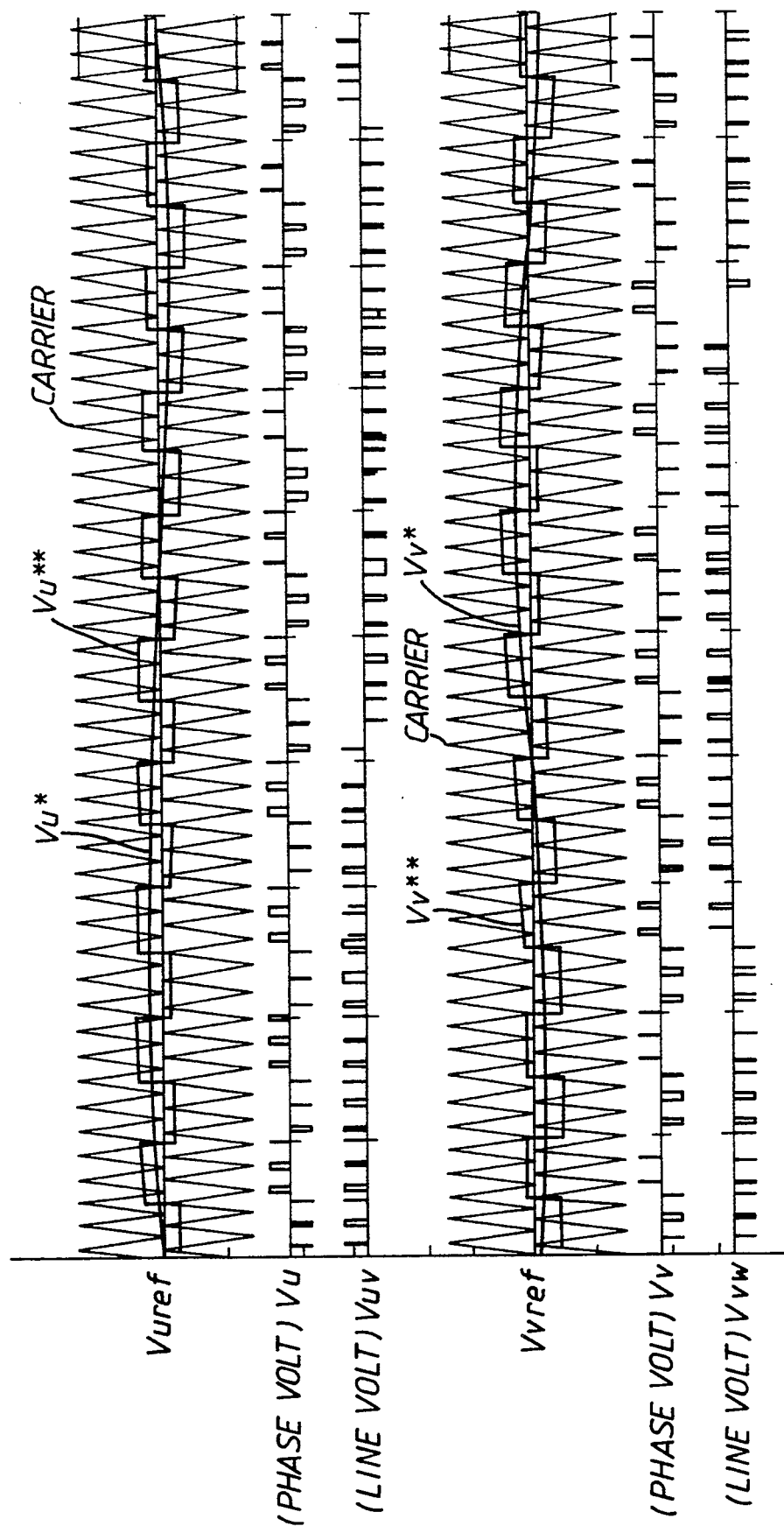
Figure 23:
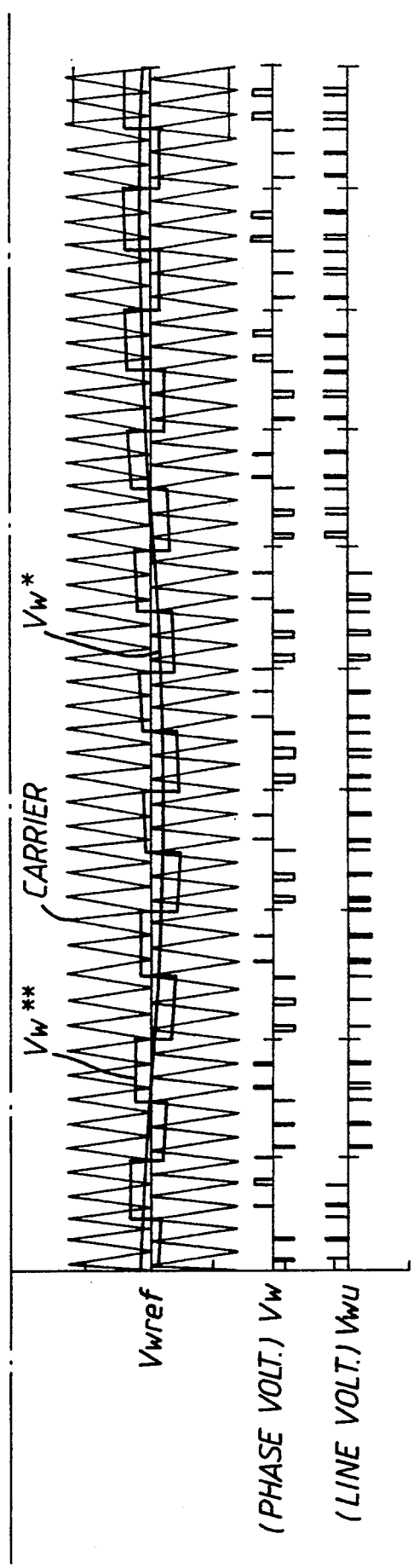

No figures are provided for the second and third embodiments of the invention;

FIG. 14 is a schematic block diagram illustrating a fourth embodiment of the invention;

FIG. 15 is a schematic block diagram illustrating a fifth embodiment of the invention;

FIG. 16 is a flowchart illustrating a sixth embodiment of the invention;

FIG. 17 is a waveform timing chart in a rectangle mode illustrating the sixth embodiment of the invention;

FIG. 18 is a flowchart illustrating a seventh embodiment of the invention;

FIG. 19 is a waveform timing chart in a rectangle mode illustrating the seventh embodiment of the invention;

FIG. 20 is a schematic view showing the eighth and ninth embodiments of the invention;

FIG. 21 is a flowchart illustrating operation of a mode decision circuit of the eight and ninth embodiments of the invention;

FIG. 22 is a waveform timing chart illustrating a voltage reference signal, line voltage and phase voltage of the eight embodiment; and FIG. 23 is a waveform timing chart illustrating a voltage reference signal, line voltage and phase voltage of the ninth embodiment.

DETAILED DESCRIPTION OF THE PREFERRED EMBODIMENTS

Figure 1:
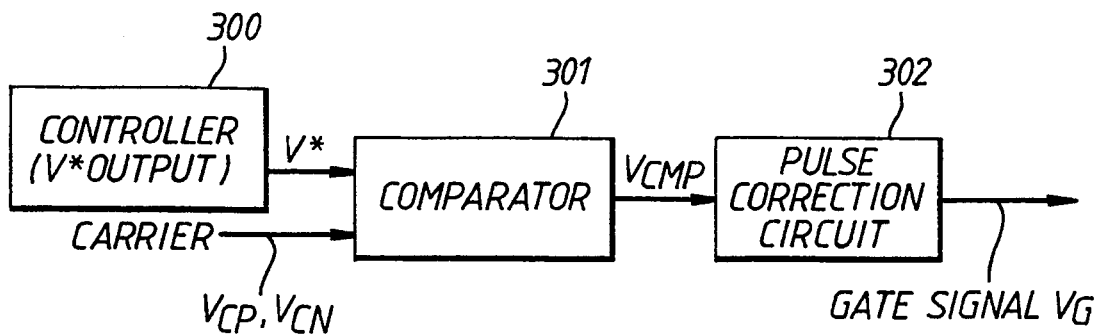
FIG. 1 is a schematic block diagram illustrating the structure of a prior art inverter control apparatus.
Figure 2:
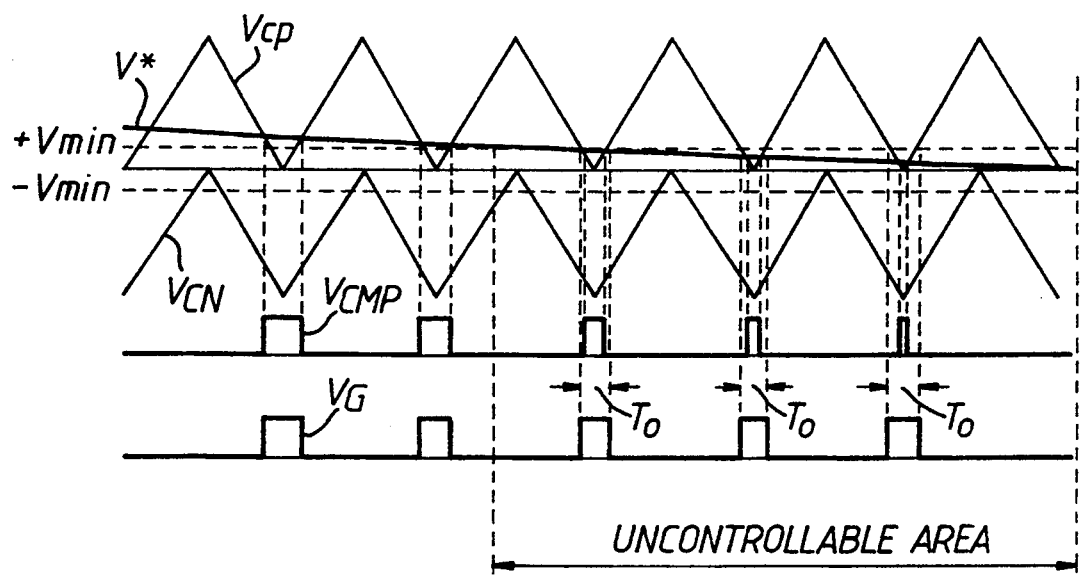
FIG. 2 illustrates prior art waveforms showing the relation among a voltage reference signal V*, carrier signals $V_{CP}$ and $V_{CN}$, minimum ON pulse width $T_O$, minimum voltage reference $\pm V_{min}$, output signal $V_{CMP}$ and gate signal $V_G$.
Figure 3:
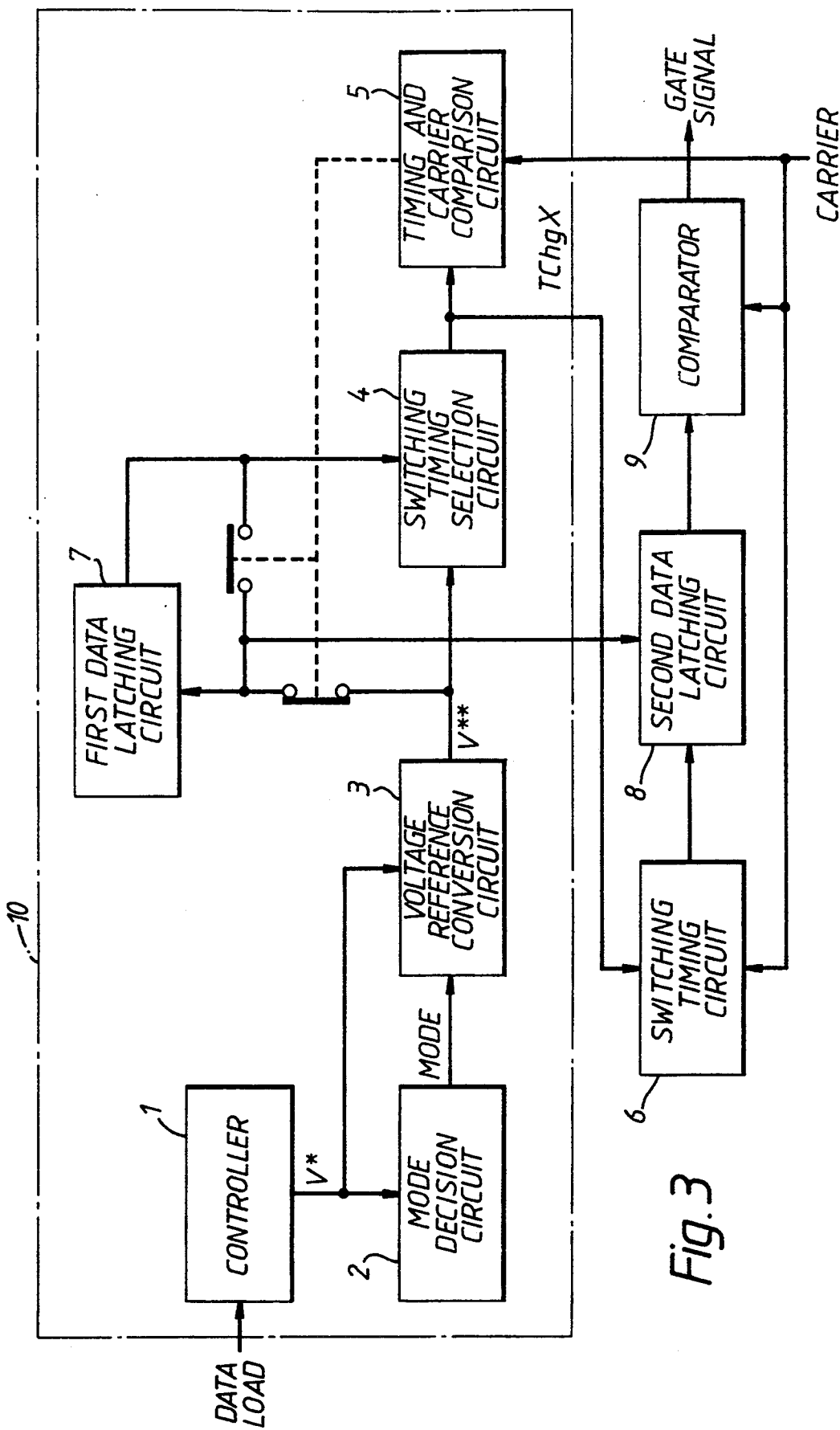
FIG. 3 is a schematic block diagram illustrating the structure of one embodiment of the invention.

FIG. 3 shows the hardware structure in an inverter control apparatus using PWM control according to a first embodiment of the invention.

Figure 4:
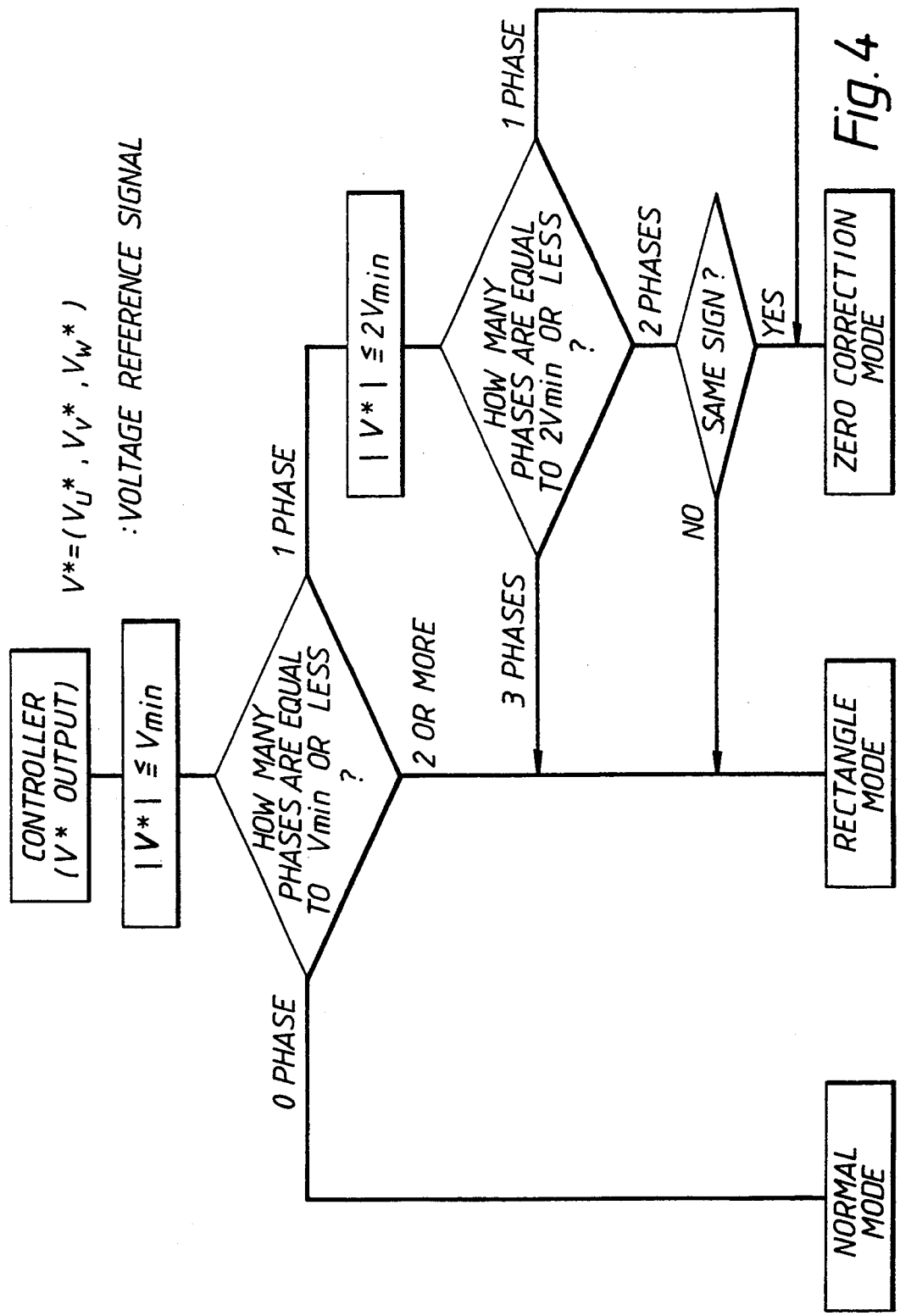
FIG. 4 is a flow chart illustrating how to determine a normal mode, rectangle mode or zero correction mode in a mode decision circuit of a first embodiment of the invention.

Referring to FIG. 3, a controller 1 outputs voltage reference signals V* (representing $V_U^*$, $V_V^*$, and $V_W^*$) for three phases (U phase, V phase and W phase) and controls an inverter (used, for example, in a speed control for a motor). A mode decision circuit 2 decides which mode of a normal mode, rectangle mode or zero correction mode will be effective in accordance with the algorithm shown in FIG. 4 whenever the voltage reference signals are output. When all of the voltage reference signals are greater than a minimum voltage reference signal $V_{min}$, the normal mode is selected. When at least two voltage reference signals ($V_U^*$ and $V_V^*$, $V_V^*$ and $V_W^*$, $V_U^*$ and $V_W^*$) are equal to or less than the minimum voltage reference signal $V_{min}$, the rectangle mode is selected. Also when three voltage reference signals are less than or equal to twice as much as the minimum voltage reference signal $V_{min}$, or when two voltage reference signals are less than or equal to twice as much as the minimum voltage reference signal $V_{min}$ and the two voltage reference signals are of opposite sign, the rectangle mode is selected. When one voltage reference signal is equal to or less than the minimum voltage reference signal $V_{min}$ and the others are less than or equal to twice as much as the minimum voltage reference signal $V_{min}$ and are of opposite sign as the minimum voltage reference signal $V_{min}$, the zero correction mode is selected.

Figure 5C:
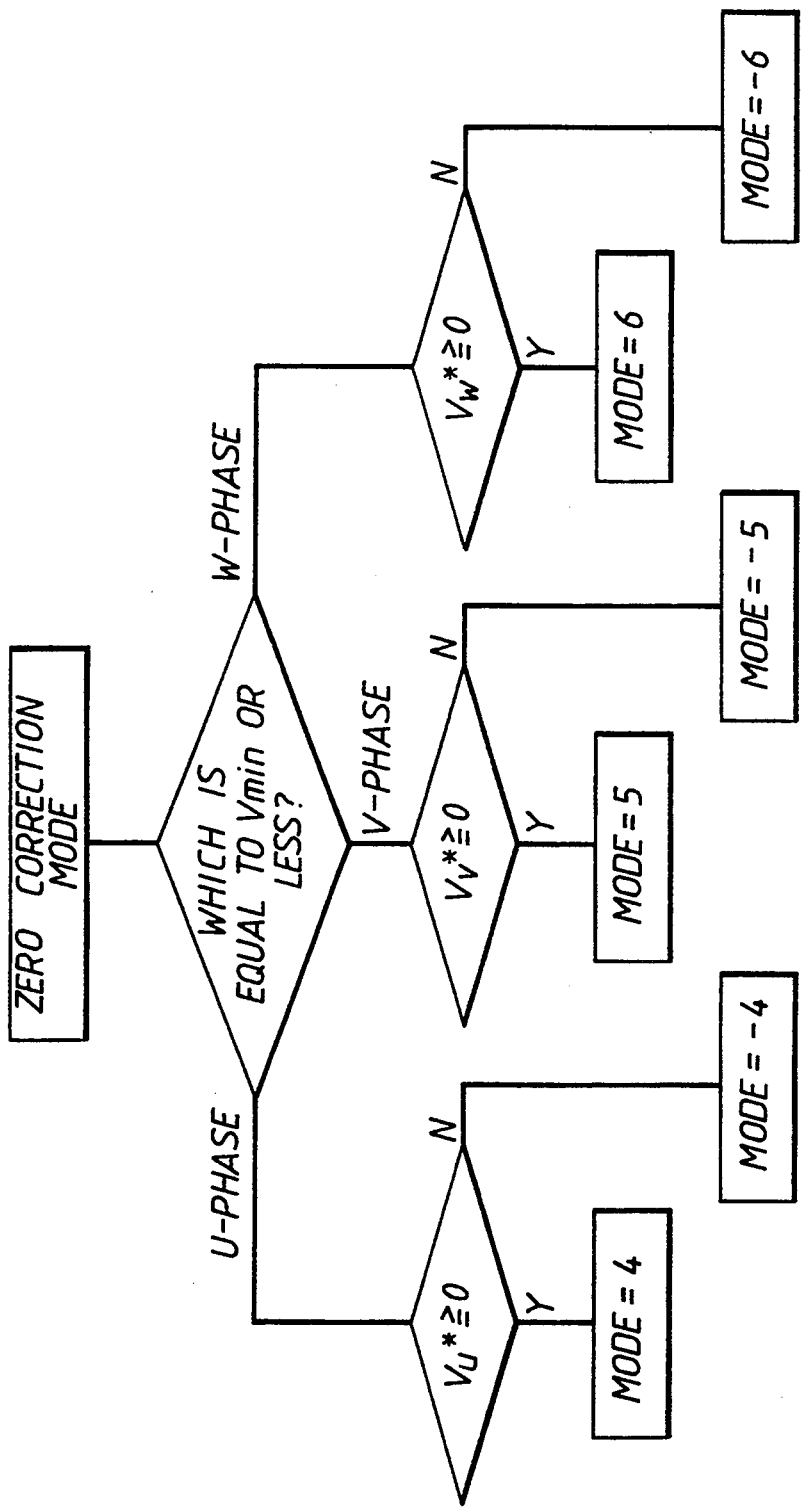
FIGS. 5 (a) through 5(c) are flowcharts illustrating operation of the normal mode, rectangle mode or zero correction mode of the first embodiment of the invention.

Further, the mode decision circuit 2 selects among the detailed modes (mode=0~±6) shown in FIGS. 5(a)–5(c), after selecting one of the three modes (normal mode, rectangle mode, and zero correction mode). In the case of the normal mode, the mode which is "Mode=0" is selected automatically as shown in FIG. 5(a). In case of the rectangle mode, as shown in FIG. 5(b), all of the voltage reference signals are multiplied together and a signal PNFLG is obtained. The signal PNFLG has a sign (i.e., a positive sign or negative sign) which changes about every 60° in phase with the voltage reference signals. When the signal PNFLG is positive, namely, when one voltage reference signal is positive and the others are negative, the voltage reference signal which has the positive maximum value of the three is selected. When the selected voltage reference signal is $V_U^*$, the mode is set "Mode=−1". Further, when the selected voltage reference signal is $V_V^*$ or $V_W^*$, the mode is set to "Mode=−2" or to "Mode=−3" respectively. When the signal PNFLG is negative, the voltage reference signal which has the greatest, negative value of the three is selected. Then when the selected voltage reference signal is $V_U^*$, $V_V^*$, or $V_W^*$, the mode is set to "Mode=1", "Mode=2", or "Mode=3" respectively.

In the case of the zero correction mode, since only one voltage reference signal is equal to or less than the minimum voltage reference signal $V_{min}$, the mode "Mode=±4" through "Mode=±6" is selected based on the voltage reference signal which is less than or equal to the minimum voltage reference signal $V_{min}$ and the polarity of this voltage reference signal as shown in FIG. 5(c).

A voltage reference conversion circuit 3 corrects the voltage reference signals $V_U^*$, $V_V^*$, and $V_W^*$ according to the mode (i.e., normal mode, rectangle mode, or zero correction mode), and outputs new voltage reference signals $V_U^{}$, $V_V^{}$, and $V_W^{**}$.

The correction will be described as follows.

(a) In the case of the normal mode:

The mode decision circuit 2 selects "Mode=0" and outputs the previous voltage reference signals $V_U^*$, $V_V^*$, and $V_W^*$ as the new voltage reference signals $V_U^{}$, $V_V^{}$, and $V_W^{**}$.

$$V_U^* = V_U^{**} \tag{1}$$

$$V_V^* = V_V^{**} \tag{2}$$

$$V_W^* = V_W^{**} \tag{3}$$

Figure 12:
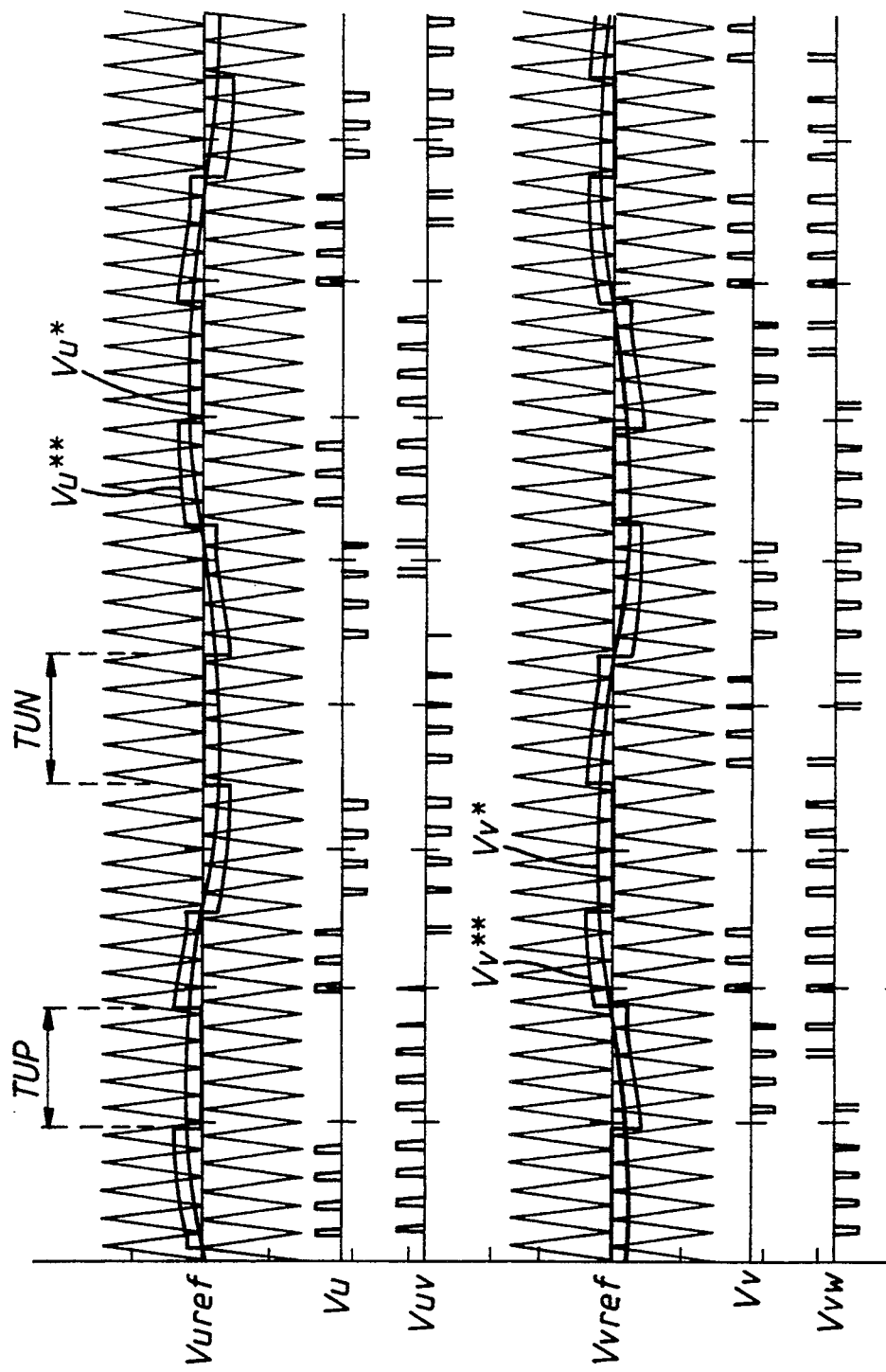
FIG. 12 is a waveform timing chart illustrating operation in which a voltage reference signal which has a phase near the positive or negative maximum value is corrected to take on a zero value in a rectangle mode of the first embodiment of the invention.
Figure 12:
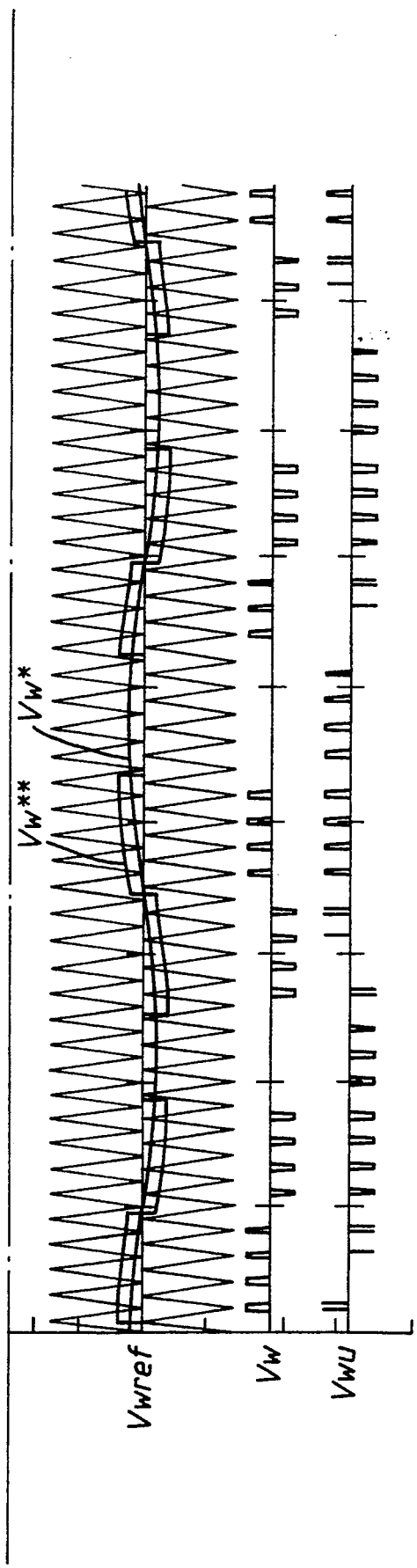

(b) In the case of the rectangle mode:

The mode decision circuit 2 selects "Mode=±1" through "Mode=±3" and fixes the voltage reference signal V* which has the greatest value of the three signals (i.e., $V_U^*$, $V_V^*$, and $V_W^*$) to the minimum voltage reference $V_{min}$ which has the opposite polarity to that of the selected greatest value voltage reference signal (or to zero voltage in the embodiment of FIG. 12). Additionally, the circuit 2 shifts the other voltage reference signals without change of the line voltage of the other phase, and outputs the fixed and shifted voltage reference signals $V_U^{}$, $V_V^{}$ and $V_W^{**}$.

For instance, when the voltage reference signal $V_U^*$ is the greatest of the three and positive, each voltage reference signal is corrected as follows.

$$V_U^{**} = -V_{min} \tag{4}$$

$$V_V^{**} = -V_{min} - (V_U^* - V_V^*) \tag{5}$$

$$V_W^{**} = -V_{min} - (V_U^* - V_W^*) \tag{6}$$

Also, when the voltage reference signal $V_U^*$ is the greatest of the three and negative, each of the voltage reference signals is corrected as follows.

$$V_U^{**} = V_{min} \tag{7}$$

$$V_V^{**} = V_{min} - (V_U^* - V_V^*) \tag{8}$$

$$V_W^{**} = V_{min} - (V_U^* - V_W^*) \tag{9}$$

Figure 6:
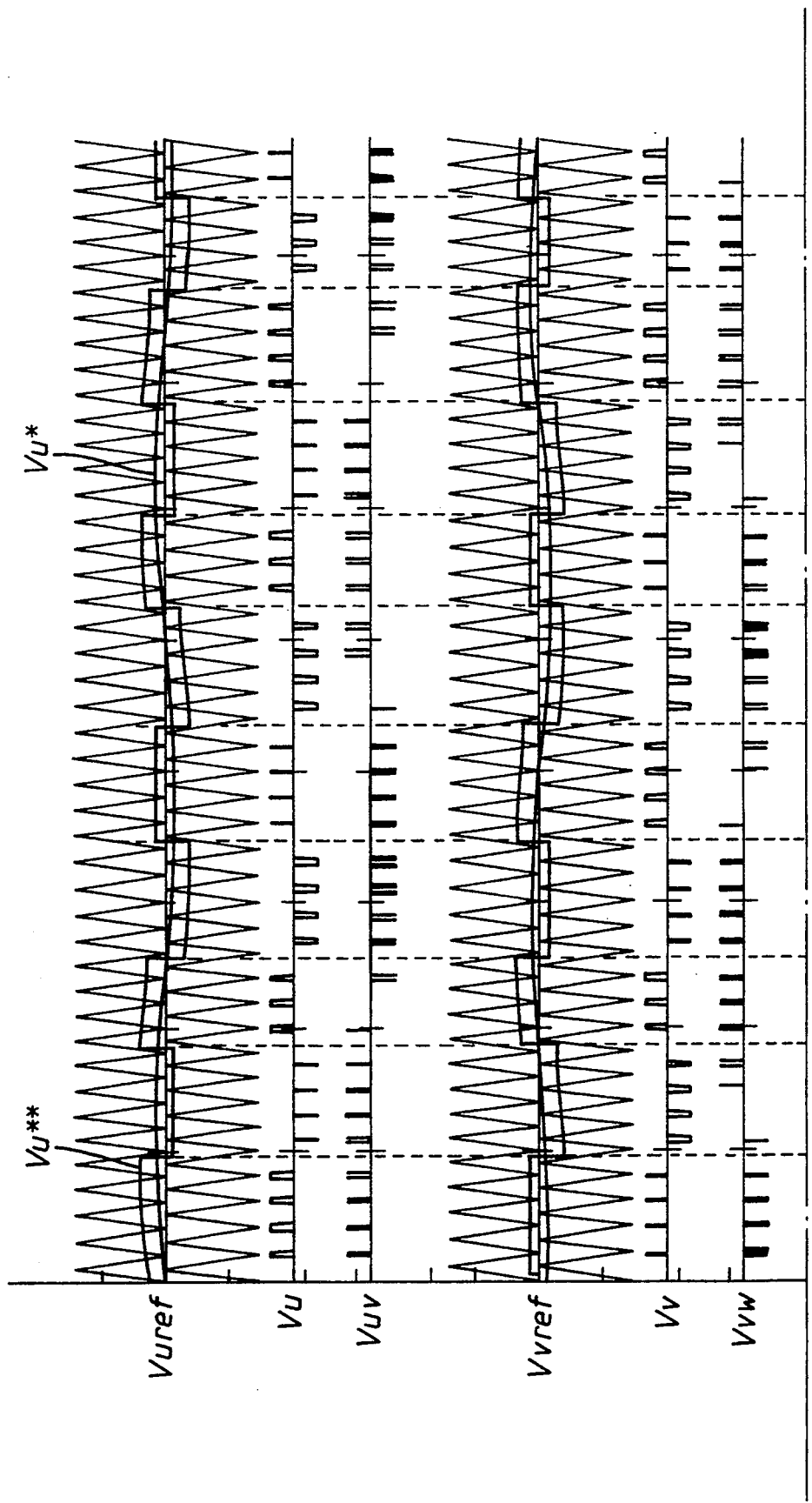
FIG. 6 is a waveform time chart illustrating operation during a rectangle mode of the first embodiment.
Figure 6:
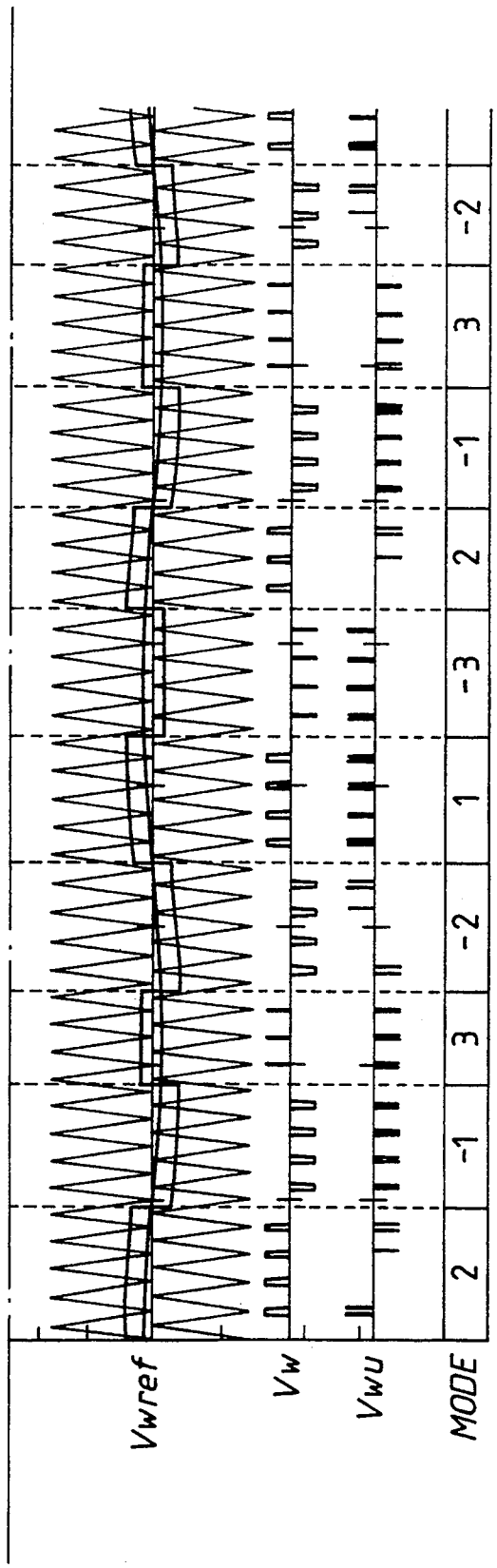

The operational waveforms during the rectangle mode are shown in FIG. 6.

In FIG. 6, $V_U$, $V_V$, and $V_W$ indicate phase voltages (e.g., see FIG. 13), and $V_{UV}$, $V_{VW}$, and $V_{WU}$ indicate line voltages respectively where:

$$V_{UV} = V_U - V_V$$

$$V_{VW} = V_V - V_W$$

and $$V_{WU} = V_W - V_U.$$

As shown in FIG. 6, the mode is changed about every 60° in phase, and the voltage reference signal which has the greatest value of the three signals (i.e., $V_U^*$, $V_V^*$, and $V_W^*$) in each mode is fixed to the minimum voltage reference signal $V_{min}$ which has the opposite polarity as the greatest value voltage reference signal. Utilization of formulas (1)–(9) has the result that all three of the voltage reference signals are shifted so that the value of the line voltages do not change from that of the previous value, e.g., the value which would have resulted using V* instead of V** as the reference voltages. As is known in the art, no change in the line voltage is equivalent to requiring that the sum of the widths of the line voltage pulses during any cycle (e.g., mode) be the same when using either V* or V** as a reference. By controlling the line voltage of the inverter, one can control the inverter output voltage as is desired.

In the rectangle mode, all three phases change positive or negative once about every 60°. Consequently, this mode is called the "60° conversion method".

(c) In the case of the zero correction mode:

The mode decision circuit 2 selects "Mode=±4" through "Mode=±6" and changes the voltage reference signal from V* to V, where V is set to the minimum voltage reference signal $V_{min}$, when the voltage reference phase V* would otherwise have crossed the zero voltage point. Further, the circuit 2 shifts the other voltage reference signals so as not to change the line voltage corresponding to the other voltage reference signals from the previous value.

For instance, when the voltage reference signal $V_U^*$ crosses the zero point from the positive side to the negative side, each voltage reference signal is corrected as follows.

$$V_U^{**} = V_{min} \tag{10}$$

$$V_V^{**} = V_{min} - (V_U^* - V_V^*) \tag{11}$$

$$V_W^{**} = V_{min} - (V_U^* - V_W^*) \tag{12}$$

Also when the voltage reference signal $V_U^*$ crosses the zero point from the negative side to the positive side, each voltage reference signal is corrected as follows.

$$V_U^{**} = -V_{min} \tag{13}$$

$$V_V^{**} = -V_{min} - (V_U^* - V_V^*) \tag{14}$$

$$V_W^{**} = -V_{min} - (V_U^* - V_W^*) \tag{15}$$

Figure 7:
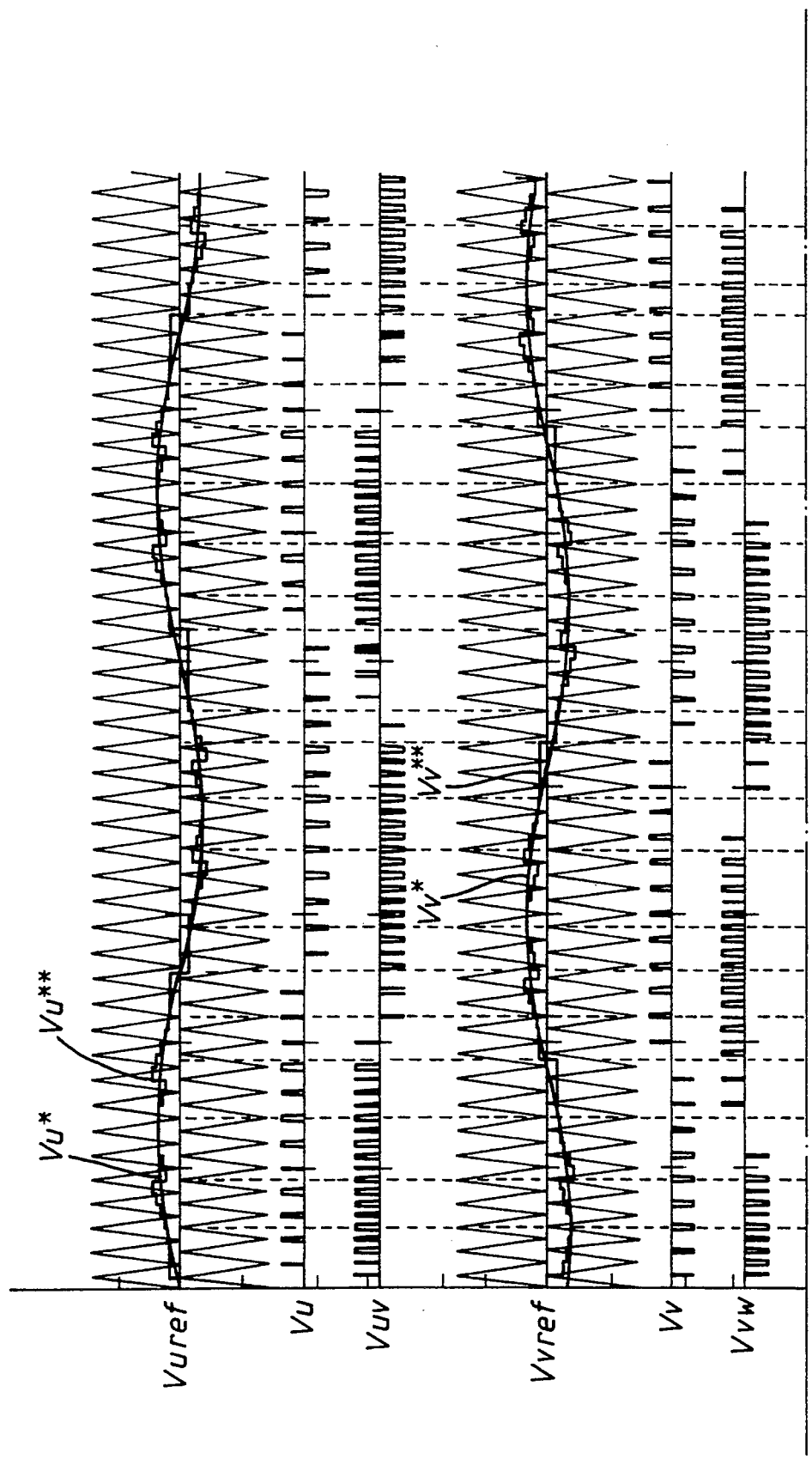
FIG. 7 is a waveform time chart illustrating operation during a zero correction mode of the first embodiment.
Figure 7:
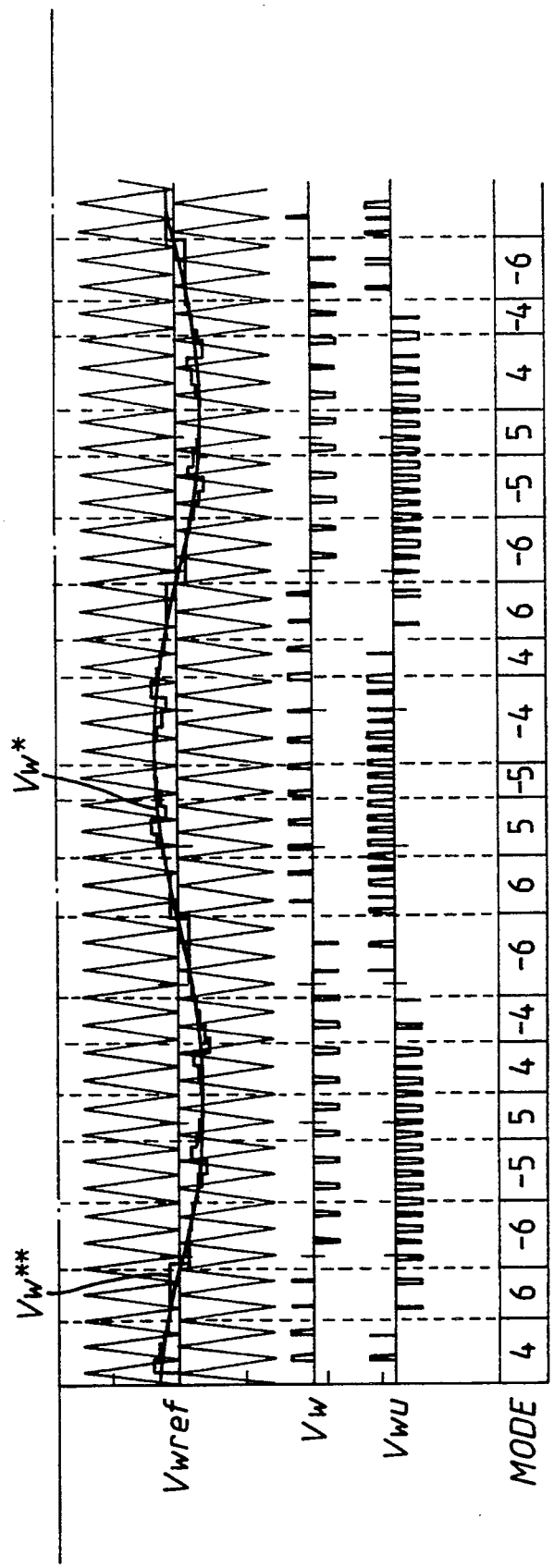

The operational waveforms during the zero correction mode are shown in FIG. 7.

A first data latching circuit 7 stores the outputs $V_U^{}$, $V_V^{}$ and $V_W^{}$ from the voltage reference conversion circuit 3 via the normally closed switch SW1. A switching timing selection circuit 4 selects one of four conversion timings 0X, 1X, 2X and 3X shown in FIG. 8 according to the outputs $V_U^{}$, $V_V^{}$ and $V_W^{}$ from the voltage reference conversion circuit 3 and the previous outputs $V_U^{}$, $V_V^{}$ and $V_W^{**}$ which are stored in the first data latching circuit 7 and are output from the circuit 7. Normally open switch SW2 connects the output of the first data latching circuit 7 with its input and also to a second data latching circuit 8.

A timing and carrier comparison circuit 5 decides whether or not to update the content in the first data latching circuit 7.

A switching timing circuit 6 latches the output of the second data latching circuit 8 (which may, for example, be a flip-flop) according to the timing which is selected by the switching timing selection circuit 4. A comparator 9 compares the output from second data latching circuit 8 and the carrier, and outputs a gate signal.

The controller 1, the mode decision circuit 2, the voltage reference conversion circuit 3, the switching timing selection circuit 4, the timing and carrier comparison circuit 5, and the data latching circuit 7 may be implemented in a data processor such as a microprocessor programmed by software. These elements may thus be referred to as CPU 10.

The data loading in CPU 10, namely, the data input into controller 1 is done at the bottom (0X) and top (2X) of the positive side carrier. The voltage reference signals $V_U^*$, $V_V^*$ and $V_W^*$ are output from controller 1. The data input provides timing and phase information for the software generation of the sinusoidal reference voltage signals V*.

The switching timing signal TChgX is output as 2-bit data (i.e., 0X=00, 1X=01, 2X=10 and 3X=11) from the switching timing selection circuit 4. The voltage reference signal V (k) indicates a signal which is output at this time, and the previous voltage reference signal V (k−1) indicates a signal which is output at the immediately proceeding time.

Figure 8:
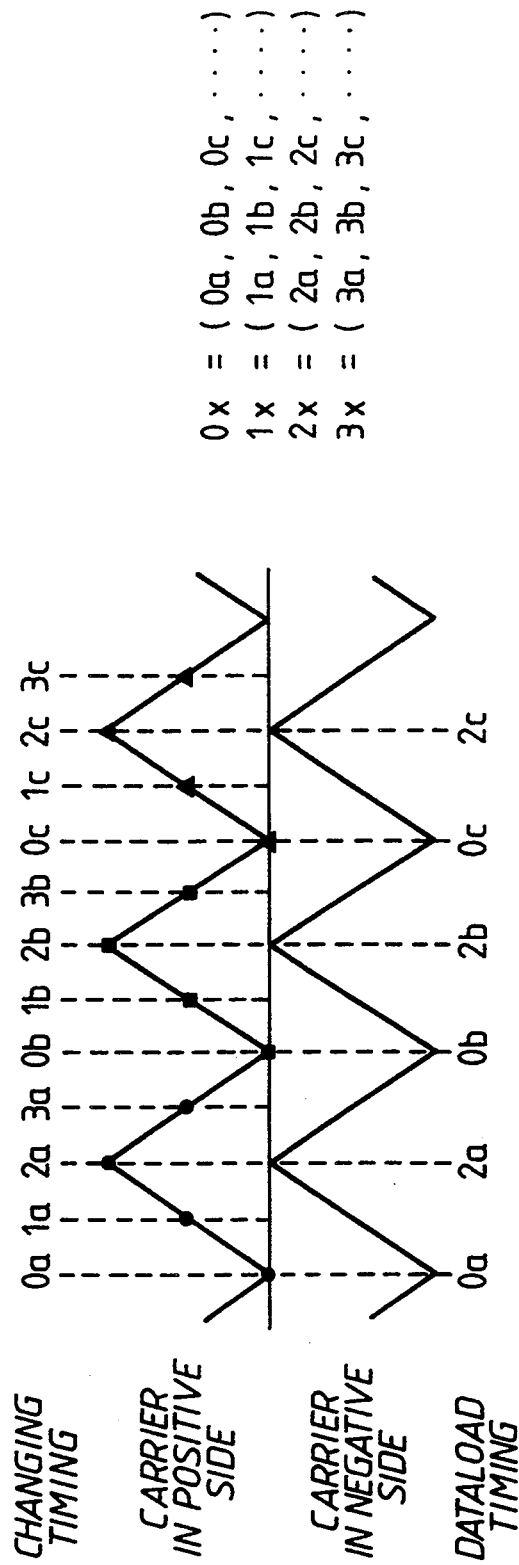
FIG. 8 is a timing chart illustrating operation of the first embodiment.
Figure 9:
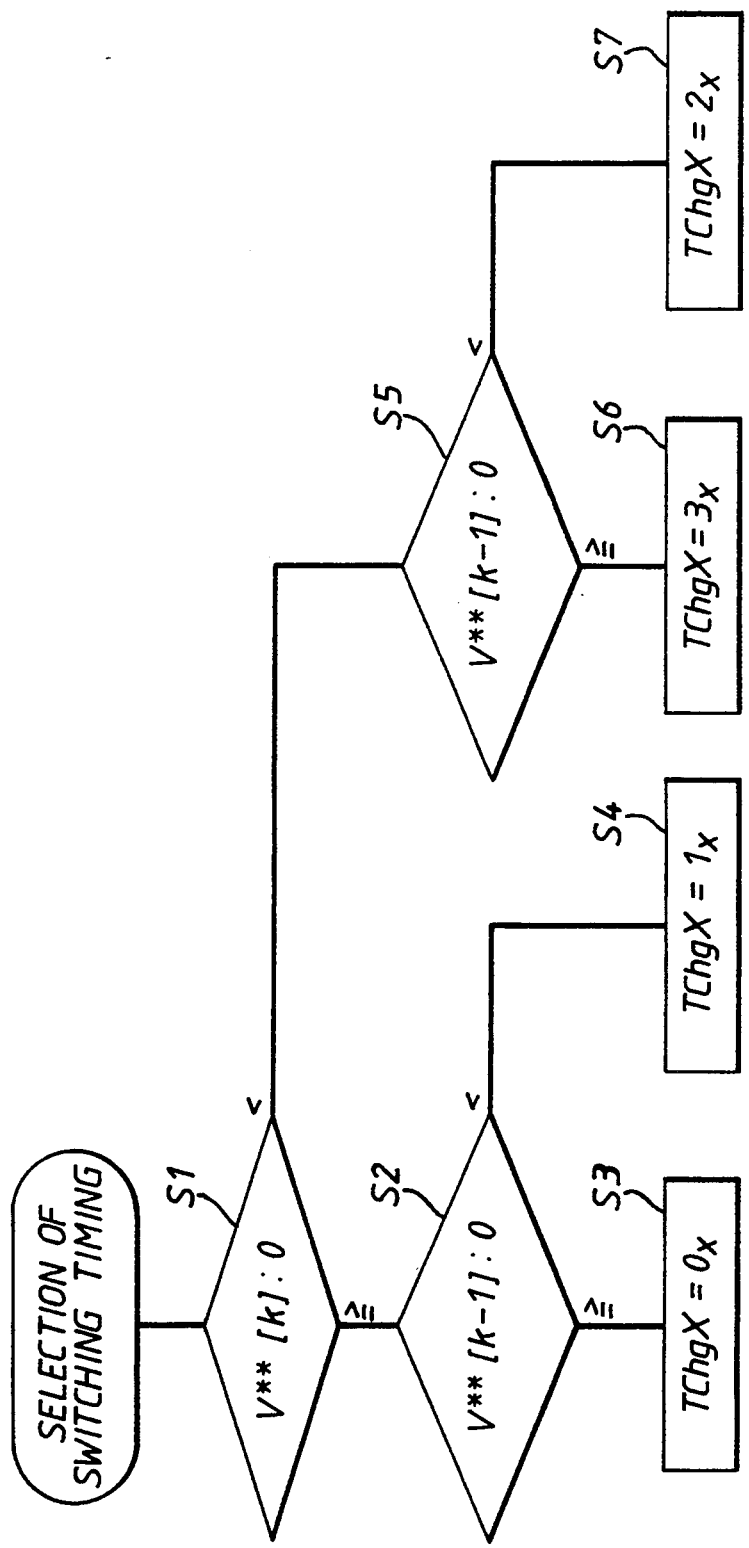
FIG. 9 is a flow chart illustrating how to select a switching timing of a switching timing selection circuit of the first embodiment.

The switching timing selection circuit 4 selects a switching timing TChgX (i.e., 0X through 3X) corresponding to the voltage reference signal V (k) and the previous voltage reference signal V(k−1) according to the flowchart shown in FIG. 9. The flowchart of FIG. 9 is appropriate whenever the reference voltage signal transitions from positive to negative or visa versa as will become apparent in view of FIG. 11(a) and the subsequent description. In FIG. 9, in step S1, the present or current value of V is compared to zero and if it is greater than or equal to zero the program proceeds to step S2 where the previous value of V is compared to zero. If this previous value is also greater than or equal to zero, the switching timing selection circuit 4 sets the value of TChgX to 0X=00 which corresponds to the 0a point in FIG. 8. If in step S2, the previous value of V is negative, the program proceeds to step S4 where the switching timing selection circuit 4 sets the value of TChgX to 1X=01 which corresponds to the 1a point in FIG. 8. If in step S1, the current value of V is negative, the program proceeds to step S5 where the previous value of V is compared to zero. If this previous value is greater than or equal to zero, the program proceeds to step S6 where the switching timing selection circuit 4 sets the value of TChgX to 3X=11 which corresponds to the 3a point in FIG. 8. If in step S5, the previous value of V is negative, the program proceeds to step S7 where switching timing selection circuit 4 sets the value of TChgX to 2X=10 which corresponds to the 2a point in FIG. 8. In the normal use of the algorithm of FIG. 9, the program proceeds according to steps S1, S2, S4 for a negative to positive transition (see FIG. 11(a)) or via steps S1, S5, S6 for a positive to negative transition (see FIG. 11 (b)).

Figure 10:
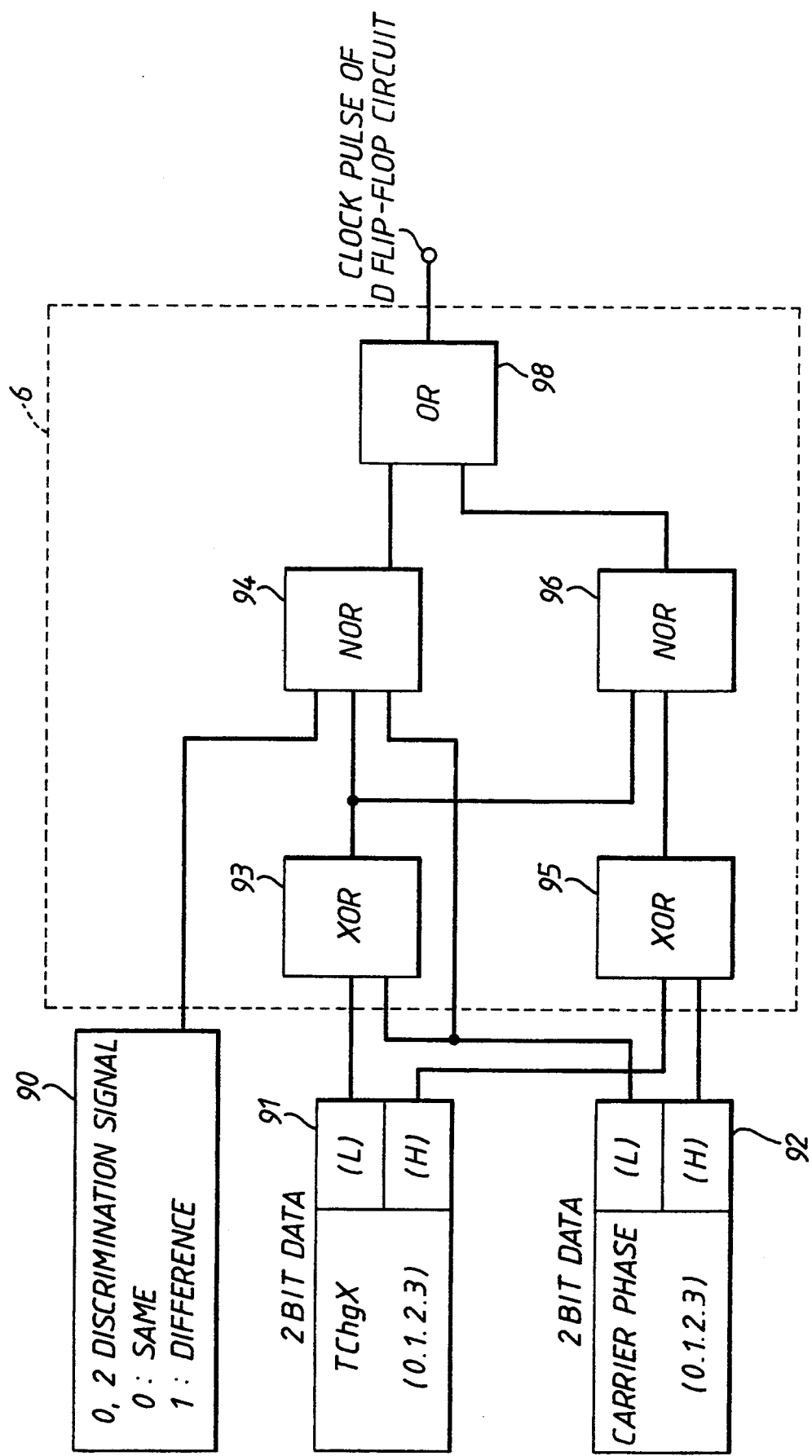
FIG. 10 is a circuit diagram illustrating a switching timing circuit of the first embodiment.

As shown in FIG. 10, the switching timing circuit 6 compares the switching timing signal TChgX 91 which consists of two bits and carrier phase signal 92 which consists of two bits. The carrier phase signal 92 may be obtained by means of dividing the carrier signal into four equal parts and distinguishing the phase range from "0X" to "3X" as shown in FIG. 8. The comparison is made using the XOR circuits 93 and 95, NOR circuits 94 and 96 and OR circuit 98. A discrimination signal 90 is also utilized to conditions the NOR circuit 94 depending upon whether or not it is desired to distinguish between the 0X and 2X timing condition. If there is no need to discriminate between 0X and 2X, the discrimination signal 90 is set to 0, and if it is desired to so discriminate, then the signal 90 is set to 1.

In FIG. 10, L indicates a lower bit and H indicates a higher bit. The XOR circuit 93 compares the lower order bits of the carrier signal and the TChgX signal and outputs a 0 logic signal whenever they are the same. The output of the XOR circuit 93 is fed to NOR circuit 94 which is also conditioned by the discrimination signal 90 and the lower order carrier bit. If it is not desired to distinguish the 0X and 2X timings (discrimination signal=0), the NOR circuit 94 outputs a logical 0 whenever the lower order bits of the TChgX signal and the carrier are both logical 0, e.g., wherever the timing is either 0X or 2X. If the discrimination signal is set to 1, the output of NOR circuit 94 will never be logical 1, and the timing is controlled by the circuits 93, 95 and 96. The inputs to the NOR circuit 96 are both logical 0 only when both the upper and lower bits of the TChgX and carrier bits are equal to each other, and thus the NOR circuit 96 outputs a logical 1 only when the timing of the TChgX and carrier are exactly equal. When these two signals are equal to each other, a clock signal is generated from the switching timing circuit 6 which enables the latching of the output data of the second data latching circuit 8.

Figure 11A:
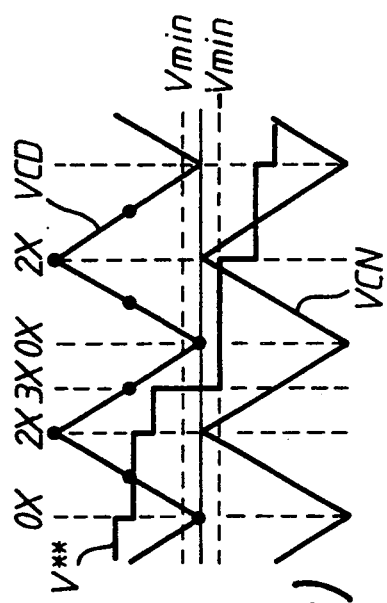
FIGS. 11(a) through 11(e) are charts illustrating a switching timing of a new voltage reference signal V (V corresponds to $V_U^{}$, $V_V^{}$ and $V_W^{**}$) of the first embodiment of the invention.
Figure 11B:
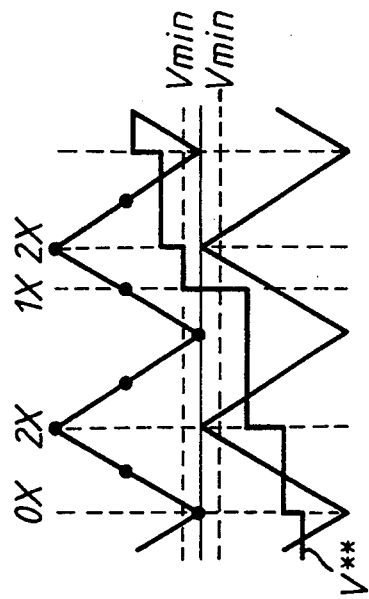

The preferred operation is illustrated in FIGS. 11(a) and 11(b). As seen in these figures, when the polarity of the voltage reference signal does not change, the switching timing changes at a timing 0X or 2X. When the polarity of the voltage reference signal changes, the switching timing changes at a timing 1X or 3X. In this case, a zero is set as the discrimination signal 90 in FIG. 10, and thus the timings 0X and 2X are not distinguished. Also, the switching timing does not switch when the voltage reference signals $V_U{}$, $V_V{}$ and $V_W{**}$ cross the carriers $V_{CP}$ and $V_{CN}$.

To effect no change in the voltage reference signal, the normally closed switch SW1 is open and the normally open switch SW2 is closed. In this manner, the previous value of the voltage reference signal, stored in the first data latching circuit 7 is output to the switching timing selection circuit 4 and via the switch SW2 to the input of the second data latching circuit 8. The newly calculated voltage reference signal is only sent to the switching timing selection circuit 4 but is not fed to the first data latching circuit 7 since the switch SW1 is open. Thus, the previous value of the voltage reference signal is again used at the timings 1X, 3X as long as the polarity of the voltage reference signal does not change. However, at timings 0X and 2X the new value of the voltage reference signal is used since now switch SW1 will be closed and SW2 will be open. In this case, the new value of the voltage reference signal is fed to the first data latching circuit 7, the switching timing selection circuit 4 and the second data latching circuit 8. The output of the first data latching circuit 7 now is fed only to the switching timing selection circuit 4 and its input is fed with the new value of the voltage reference signal. Thus, in this case, the value of the voltage reference signal changes as seen in FIGS. 11(a) and 11(b).

Figure 11C:
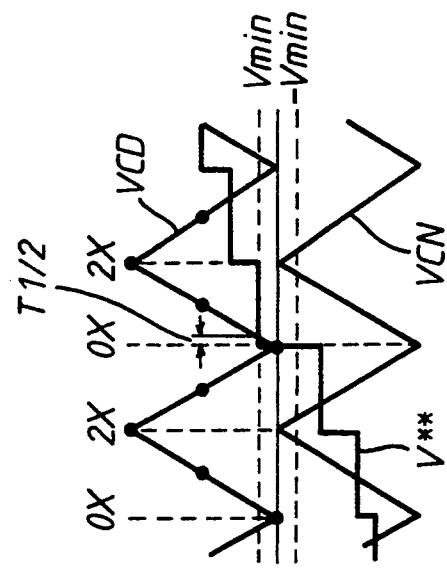
Figure 11D:
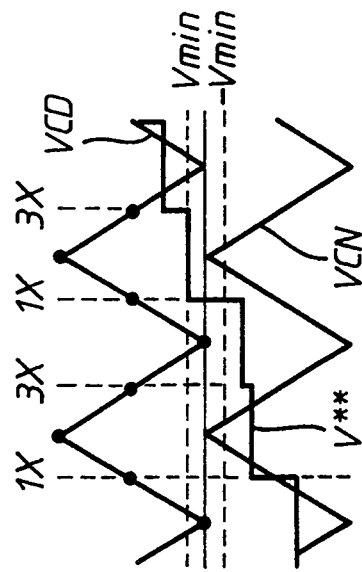

If the switching timing is always fixed at the timings 0X and 2X, or the timings 1X and 3X, the voltage reference signals $V_U{}$, $V_V{}$ and $V_W{}$ would cross the carriers $V_{CP}$ and $V_{CN}$, and pulses of widths which are less than minimum ON-pulse widths would be generated at the time that the voltage reference signals $V_U{}$, $V_V{}$ and $V_W{}$ are generated as shown in FIGS. 11(c) and 11(d). The above fixed switching timing corresponds to a region in which the voltage reference signals are close to zero voltage or close to a high voltage regime. Use of this switching timing is thus not done since it would result in the same problem as exists in the prior art in generating gate pulses less than the minimum ON pulse width.

The timing and carrier comparison circuit 5 is similar to the switching timing circuit 6. It compares the switching timing signal TChgX, consisting of two bits and the carrier phase signal, consisting of two bits. When the two signals are equal, the circuit 5 controls the operation of the switches SW1 and SW2 to update the content of first data latching circuit 7 and thus assist in selecting the correct switching timing.

Normally, the calculation of the new values of the voltage reference signals are accomplished substantially instantaneously and the procedure set forth above produces the desired result as shown in FIGS. 11(a) and 11(b).

Sometimes, however, the calculations may take considerably longer. For instance, as shown in FIG. 8, the data loading is done at the timing 0a and the new data values for the voltage reference signal are not ready until time 2a. In this case, if the switching is done at the time 1a, the switching timing signal TChgX is output before the finish of the V** calculation at time 2a. Since the resulting data is thus incorrect, the output from second data latching circuit 8 is not latched between the timing 2a and timing 0b. In this situation, when the next switching timing is selected, the content of first data latching circuit 7 is not rewritten since the correct result cannot be obtained.

In the case of pulse width modulation (PWM) control using gate turn-off (GTO) thyristors, when an imperfect OFF-gate pulse is fed to the GTO thyristor, current concentrates at one part inside the GTO thyristor and the GTO thyristor breaks down. Accordingly the width of the ON-gate pulse is controlled so as not to be less than the minimum ON-pulse width.

Figure 11E:
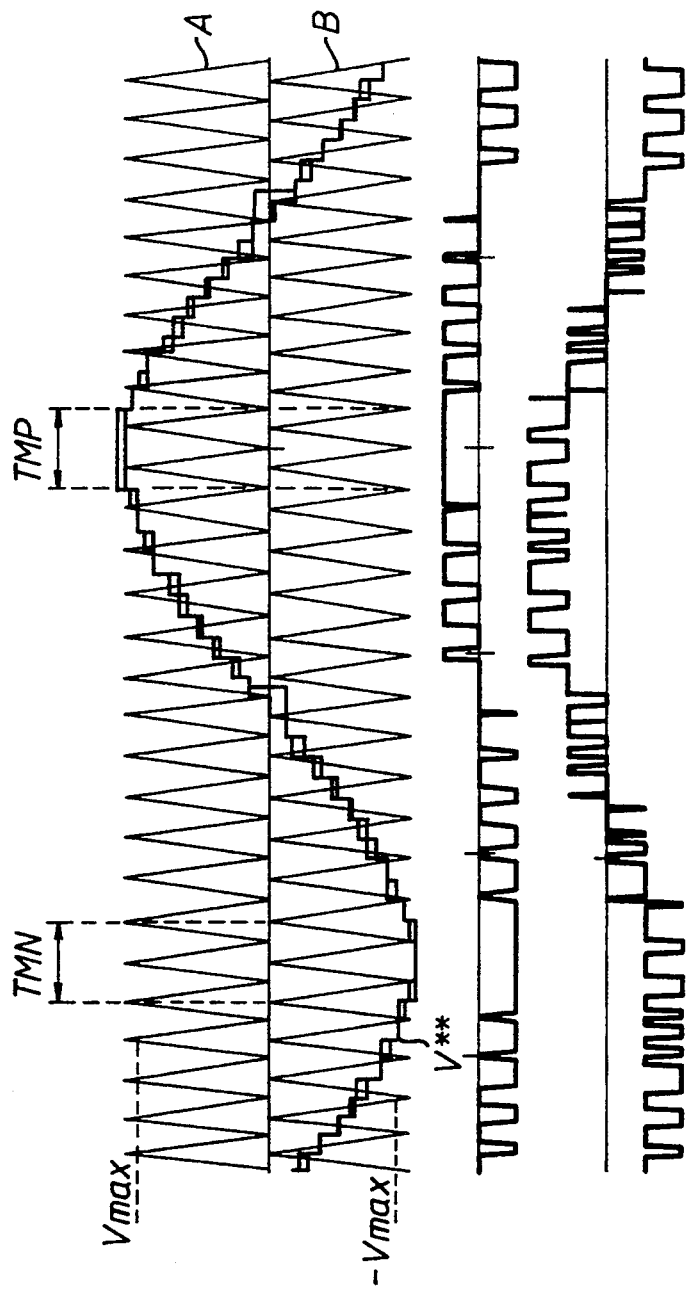

As shown in FIG. 11(e), since the width of the pulse becomes less than the minimum OFF-pulse width in areas $T_{MP}$ and $T_{MN}$ where the voltage reference V (V indicates the voltage reference signals $V_U{}$, $V_V{}$ and $V_W{**}$) is over the maximum voltage references $V_{max}$ and $-V_{max}$, the GTO thyristors are held ON in these areas. The maximum voltage references $V_{max}$ and $-V_{max}$ are near the maximum value of carrier signals A and B. The carrier signal A is a triangular wave which has a constant frequency, and changes in level between 0 and $V_{max}$. The carrier signal B is a triangular wave which has a constant frequency, changes in level between 0 and $-V_{max}$, and is in phase with the carrier signal A. That is, when $A=V_{max}$, $B=0$, and when $A=0$, $B=-V_{max}$.

In the above case, the starting point and ending point in the area $T_{MP}$ are changed at the timing 0X and the starting point and ending point in the area $T_{MN}$ are changed at the timing 2X. In this case, the value 1 is set as the discrimination signal 90 of FIG. 10, and the timings 0X and 2X may thus be distinguished. Accordingly, a positive maximum voltage output area may be distinguished from a negative maximum voltage output area.

In the rectangle mode (60° conversion method), a correction is achieved by converting $V^*$ to $V^{}$ in which $V^{}$ changes sign in relation to $V^*$ and takes on the value of the positive or negative minimum voltage reference $V_{min}$. Accordingly, an alternative embodiment to that of fixing the voltage reference signal to such minimum values is to fix the voltage reference signal to 0 (zero). The voltage reference signal which is set to zero is the positive or negative maximum value of the three phases.

FIG. 12 shows an example of a waveform of the voltage reference signals $V_U^*$ through $V_W^*$ corresponding to the above correction, and an example of a waveform of the PWM controlled output voltage (phase voltage and line voltage).

As shown in FIG. 12, the corrected voltage reference signal $V_U^{**}$ is 0 (zero) during the times $T_{UP}$ and $T_{UN}$ in which the voltage reference signal $V_U^*$ corresponds to the positive and negative maximum values.

Figure 13:
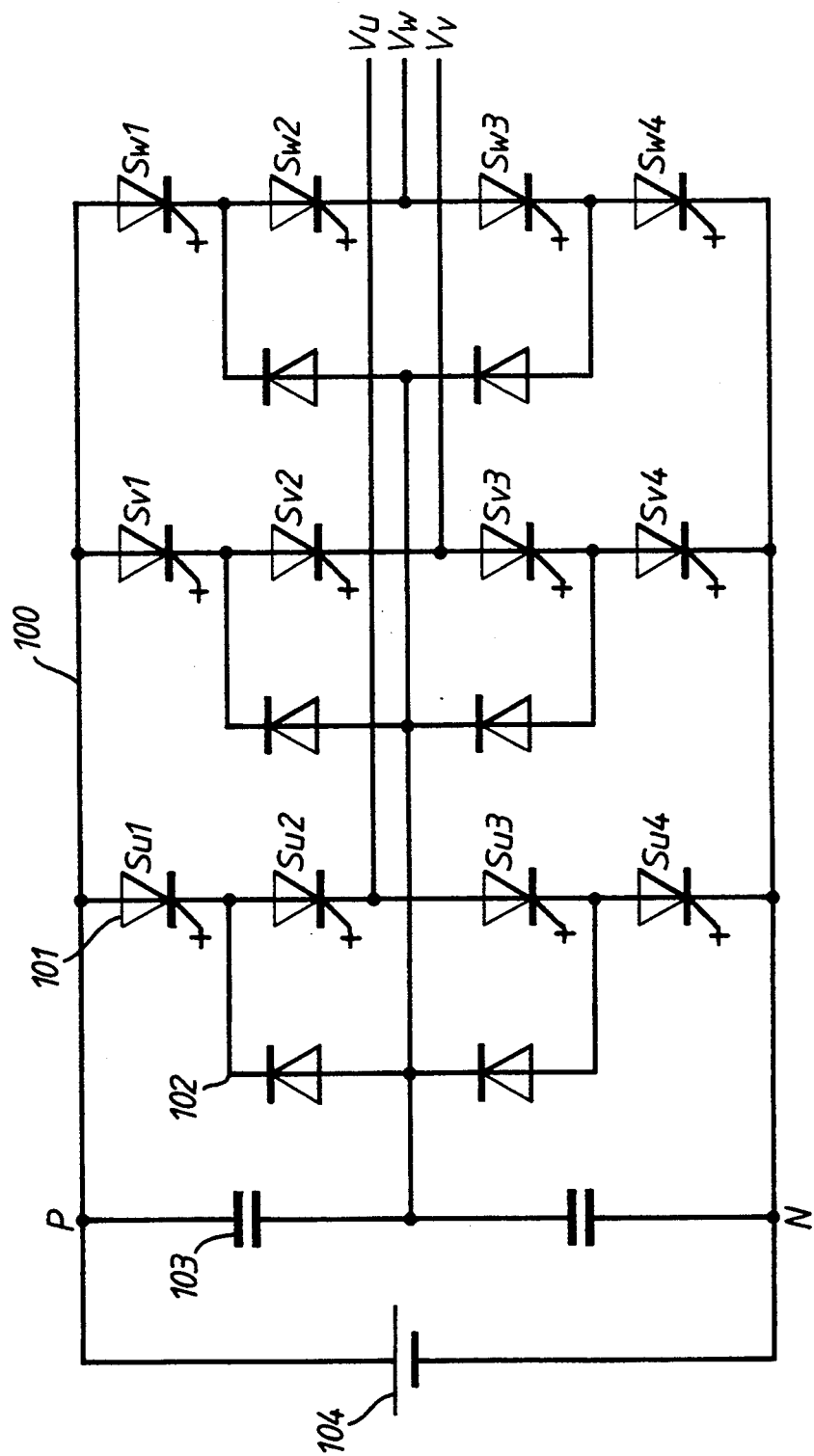
FIG. 13 is a schematic view illustrating a main circuit of a neutral point clamped three-phase inverter.

A main circuit of a neutral point clamped three-phase inverter is shown in FIG. 13. Further details concerning the operation of the inverter may be obtained, for example, from the above referenced co-pending application.

A neutral point is provided by two capacitors 103. Those capacitors 103 are provided between positive side P and negative side N of a DC voltage source 104. Zero voltage can be output, since voltage outputs $V_U$, $V_V$ and $V_W$ are clamped to the neutral point. Consequently, the electric potential between positive side P and negative side N of the DC voltage source 104 and a three-level voltage output are obtained. In relation to FIG. 3, it will be appreciated that the output of the comparator 9 provides six separate gate pulses to turn on/off the GTOs along six separate gate lines. The GTOs are operated in pairs, one being turned on when the other is turned off. The six pairs are: SU1,SU3; SU2,SU4; SV1,SV3; SV2,SV4; SW1,SW3; and SW2,SW4.

If the voltage reference is fixed to the zero voltage as described above, the number of times the GTO thyristors need to be switched decreases sharply. As the switching loss decreases, the efficiency of operation improves. Further, as the current flowing through the GTO thyristors flows equally in the positive direction and negative direction alternately, heat which is generated from the GTO thyristors is balanced and the rate of using the GTO thyristors is decreased. Moreover, it is possible to control the output voltage without outputting a pulse which is equal to or less than the minimum ON pulse width near the zero point of the voltage reference due to the zero correction mode. Additionally, it is possible to control a high output voltage without outputting a pulse which is equal to or less than the minimum OFF pulse width near the maximum value of the voltage reference. Accordingly, since it is possible to control the line voltage linearly over the whole output voltage area from the low output voltage area to the high output voltage area, one may obtain an accurately controllable inverter.

Next a second embodiment of the invention will be described.

In this embodiment, when any one or more voltage reference signals, $V_U^*$, $V_V^*$ and $V_W^*$, are equal to or less than the minimum voltage reference signal $V_{min}$, the zero correction mode is selected. When not included, the normal mode is selected. This operation is achieved by the mode decision circuit 2. In this second embodiment, no rectangular mode is utilized.

In the case of the zero correction mode, a phase (U phase, V phase or W phase) which is equal to or less than the minimum voltage reference signal $V_{min}$ is distinguished, and then the type of mode, which is comprised of "Mode=±4" through "Mode=±6", is selected as shown in FIG. 5(c).

The voltage reference conversion circuit 3 converts the voltage reference signals $V_U^*$, $V_V^*$ and $V_W^*$ into new voltage reference signals $V_U^{}$, $V_V^{}$ and $V_W^{**}$ due to the distinguished modes. An example for mode=±4 is illustrative.

(1) Mode=4: Only $V_U^*$ is equal to 0 or greater and is equal to $V_{min}$ or less.

$$V_U^{**}=V_{min} \tag{16}$$

$$V_V^{**}=V_{min}-(V_U^*-V_V^*) \tag{17}$$

$$V_W^{**}=V_{min}-(V_U^*-V_W^*) \tag{18}$$

(2) Mode=−4: Only $V_U^*$ is equal to $-V_{min}$ or greater and is less than 0.

$$V_U^{**}=-V_{min} \tag{19}$$

$$V_V^{**}=-V_{min}-(V_U^*-V_V^*) \tag{20}$$

$$V_W^{**}=-V_{min}-(V_U^*-V_W^*) \tag{21}$$

As described above, the voltage reference signal is discontinuous in phase voltage, but the voltage reference signal can form a continuous sinewave in line voltage which is the difference between the phase voltages.

According to the second embodiment, it is possible to control the low output voltage without outputting a pulse which is equal to or less than the minimum ON pulse width near the zero point of the voltage reference. Further it is possible to control the high output voltage without outputting a pulse which is equal to or less than the minimum OFF pulse width near the maximum value of the voltage reference.

Consequently, when this operation is used in a neutral point clamped inverter, it is possible to control the line output voltage linearly over the whole output voltage area from the low output voltage area to the high output voltage area without increasing the number of switchings for the switching element, e.g., the GTO thyristors.

Next a third embodiment of the invention will be described. This embodiment utilizes only the rectangular correction mode.

In this embodiment, a first method of selecting the positive maximum value of the voltage reference signals $V_U^*$, $V_V^*$ and $V_W^*$ and a second method of selecting the negative maximum value of the voltage reference signals $V_U^*$, $V_V^*$ and $V_W^*$ are used about every 60° at the phase of the U phase voltage reference signal $V_U^*$ in the mode decision circuit 2 shown in FIG. 3. For example, in the first method when the positive maximum value is the U phase voltage reference signal $V_U^*$, "Mode=−1" is selected. Also when the negative maximum value is the U phase voltage reference signal $V_U^*$, "Mode=1" is selected.

Further, the voltage reference conversion circuit 3 converts the voltage reference signals $V_U^*$, $V_V^*$ and $V_W^*$ into new voltage reference signals $V_U^{}$, $V_V^{}$ and $V_W^{**}$ due to the selected mode in the mode decision circuit 2.

For example, in the case of "Mode=1", new voltage reference signals $V_U^{}$, $V_V^{}$ and $V_W^{}$ are obtained in accordance with the expressions (16) through (18). Moreover in the case of "Mode=−1", new voltage reference signals $V_U^{}$, $V_V^{}$ and $V_W^{}$ are obtained in accordance with the expressions (19) through (21).

Consequently, the new voltage reference signals are discontinuous in phase voltage, but the new voltage reference signals can form a continuous sinewave in line voltage which is the difference between the phase voltages.

Next a fourth embodiment of the invention will be described with reference to FIG. 14.

As shown in FIG. 14, in the fourth embodiment of the invention, the switching timing selection circuit 4, the timing and carrier comparison circuit 5 and the first data latching circuit 7 are omitted. A timing circuit 6A is provided instead of the switching timing circuit 6.

The timing circuit 6A changes the voltage reference signal at the fixed timings 0X and 2X and may be implemented with simple NOR circuitry.

In this case, the pulse widths of the minimum voltage reference signal $V_{min}$ and the maximum voltage reference signal $V_{max}$ are set to be twice as great as the minimum ON pulse width and the minimum OFF pulse width, since in the case of the 0X and 2X timings as seen in FIGS. 11(c) and 11(d), when the voltage reference is changed, a pulse which has half the width as the minimum ON pulse width or the minimum OFF pulse width is generated.

According to the fourth embodiment, it is possible to control the line voltage linearly over the whole output voltage area.

Next a fifth embodiment of the invention will be described with reference to FIG. 15.

In this fifth embodiment, a level detection circuit 11 and a pulse correction circuit 12 are provided in addition to the elements of the fourth embodiment.

The level detection circuit 11 distinguishes whether the new voltage reference signals $V_U^{}$, $V_V^{}$ and $V_W^{}$ are near the zero point or the signals $V_U^{}$, $V_V^{}$ and $V_W^{}$ are near the maximum voltage value.

The pulse correction circuit 12 deletes a pulse or fixes the pulse width to the minimum ON pulse width or the minimum OFF pulse width.

The pulse is generated when the voltage reference is changed and has a minimum ON pulse width or a minimum OFF pulse width given by half width $T_{\frac{1}{2}}$ in FIG. 11 (c).

Next a method of deciding the mode during the rectangle mode will be described as a sixth embodiment of the invention with reference to FIGS. 16 and 17.

In this embodiment, when the mode is changed to the rectangle mode, a periodic clock pulse is counted. Whenever the counted number reaches a determined clock number, the counted number is initialized and the sign of the flag PNFLG is changed. As a result, the type of mode may be distinguished from the sign of PNFLG. The mode consists of six kinds which are "Mode=±1" through "Mode=±3".

In this method the sign of PNFLG periodically changes. The change is not related to the frequency of voltage reference signals $V_U^*$, $V_V^*$ and $V_W^*$. This method is named the "time changing method of the rectangle mode."

An example of the waveform resulting when the sign of PNFLG is changed every 20 ms using the above method is illustrated in FIG. 17.

Accordingly to the sixth embodiment, since the switching elements (GOT thyristors) which are provided at the positive side and negative side become ON without relation to the frequency of the voltage reference signals $V_U^*$, $V_V^*$ and $V_W^*$, the range of temperature variations of the switching elements can be controlled to be quite small.

Consequently, the efficiency of operating the inverter is greatly improved.

Next a seventh embodiment of the invention will be described with reference to FIG. 18.

As shown in FIG. 18, when the mode is changed to the rectangle mode, the system distinguishes whether or not the frequency of changes in the voltage reference signals $V_U^*$, $V_V^*$ and $V_W^*$ are greater than a preset value. As a result, when the frequency is equal to or greater than the preset value, the mode decision is done as described in FIG. 5(b). When the frequency is less than the preset value, the mode decision is done as described in FIG. 16.

A waveform example is illustrated in FIG. 19. In this example, the waveform is generated when the frequency of the voltage reference changes from 5 Hz to 10 Hz and the time changing method is changed to the 60° changing method near 8.3Hz.

According to the seventh embodiment, in the low frequency regime or during outputting DC power, it is possible to control the increase of temperature of the switching elements due to the time changing method.

Accordingly, the efficiency of operating is improved.

In the normal frequency area, the number of switchings required for the switching elements such as the GTO thyristors decreases sharply.

Consequently, it is possible to operate the inverter in an efficient manner.

Next an eighth embodiment of the invention will be described in reference to FIG. 20.

FIG. 20 shows a neutral point clamped inverter using PWM control. A controller 201 outputs voltage reference signals $V_U^*$, $V_V^*$ and $V_W^*$ and controls an inverter (not shown). A mode decision circuit 202 sets a 1 or −1 into a positive/negative changing signal PNFLG every positive or negative period T of $V^{**}$. The period is timed by means of a timer or counter (not shown) which increments an index i as shown in FIG. 21 in a similar fashion as in FIG. 16.

When the signal PNFLG is 1, a voltage reference signal which has the positive maximum value of the three signals $V_U^*$, $V_V^*$ and $V_W^*$ is selected. If the selected signal is $V_U^*$, "Mode 1" is selected. Further, if the selected signal is $V_V^*$ or $V_W^*$, "Mode 2" or "Mode 3" is selected respectively. Additionally, when the signal PNFLG is −1, the voltage reference signal which has the negative maximum value of the three signals $V_U^*$, $V_V^*$ and $V_W^*$ is selected. If the selected signal is $V_U^*$, $V_V^*$ or $V_W^*$, "Mode $-1$", "Mode $-2$" or "Mode $-3$" is selected respectively.

Accordingly, the mode decision circuit 202 outputs one of the possible six types of modes as described above.

A voltage reference conversion circuit 203 corrects the voltage reference signals $V_U^*$, $V_V^*$ and $V_W^*$ and output new voltage reference signals $V_U^{}$, $V_V^{}$ and $V_W^{**}$ due to the above modes. An example for the U-phase is as follows with the other phases related in a similar manner.

(1) Mode=1: when $V_U^*$ is the positive maximum value of the three signals.

$$V_U^{**} = V_{max} \tag{22}$$

$$V_V^{**} = V_{max} - (V_U^* - V_V^*) \tag{23}$$

$$V_W^{**} = V_{max} - (V_U^* - V_W^*) \tag{24}$$

(2) Mode=$-1$: when $V_U^*$ is the negative maximum value of the three signals.

$$V_U^{**} = -V_{max} \tag{25}$$

$$V_V^{**} = -V_{max} - (V_U^* - V_V^*) \tag{26}$$

$$V_W^{**} = -V_{max} - (V_U^* - V_W^*) \tag{27}$$

$V_{max}$ means the maximum voltage reference.

FIG. 22 shows waveforms of the voltage reference signals, the phase voltages and the line voltages in accordance with the eighth embodiment of the invention.

The controller 201, the mode decision circuit 202 and the voltage reference conversion circuit 203 may be implemented in software via a programmed data processor such as a microprocessor. These elements may thus be referred to as CPU 205.

As described above, in this embodiment, the voltage reference is discontinuous in the phase voltage; however, the new voltage reference signals $V_U^{}$, $V_V^{}$ and $V_W^{**}$ can form a continuous sinewave in the line voltage which is the difference between the phase voltages.

A comparator 204 compares the new voltage reference signals $V_U^{}$, $V_V^{}$ and $V_W^{**}$ from the voltage reference conversion circuit 203 with the carrier signals, and produces a gate signal when the reference signals cross the carrier signals.

Accordingly, the voltage reference signals $V_U^*$, $V_V^*$ and $V_W^*$ are not output as a pulse which is equal to or less than the minimum ON pulse width from the voltage reference conversion circuit 203. Further, the line voltage is converted to new voltage reference signals $V_U^{}$, $V_V^{}$, and $V_W^{}$ respectively. The line voltage signals corresponding to $V_U^{}$, $V_V^{}$ and $V_W^{}$ form a continuous sinewave.

Consequently, when the output frequency from the inverter is in the low voltage regime, the increase in temperature of the switching elements, such as GTO thyristors, is fixed, and it is possible to control the output line voltage linearly.

Next, a ninth embodiment of the invention will now be described.

In this embodiment, a positive/negative changing signal PNFLG is set to "+1" or "$-1$" in the mode decision circuit 202 (shown in FIG. 20) every positive/negative changing period T by a timer (not shown). Then, due to the positive/negative changing signal PNFLG, the voltage reference signals $V_U^*$, $V_V^*$ and $V_W^*$ are added to a fixed voltage reference using the following expressions, and new voltage reference signals $V_U^{}$, $V_V^{}$ and $V_W^{**}$ are obtained as shown in FIG. 23.

All of the new voltage reference signals $V_U^{}$, $V_V^{}$ and $V_W^{**}$ are changed positive or negative every positive/negative changing period T.

(1) When PNFLG is "1":

$$V_U^{**} = V_U^* + \tfrac{1}{2} \cdot V_{max} \tag{28}$$

$$V_V^{**} = V_V^* + \tfrac{1}{2} \cdot V_{max} \tag{29}$$

$$V_W^{**} = V_W^* + \tfrac{1}{2} \cdot V_{max} \tag{30}$$

(1) When PNFLG is "$-1$":

$$V_U^{**} = V_U^* + \tfrac{1}{2} \cdot V_{max} \tag{31}$$

$$V_V^{**} = V_V^* + \tfrac{1}{2} \cdot V_{max} \tag{32}$$

$$V_W^{**} = V_W^* + \tfrac{1}{2} \cdot V_{max} \tag{33}$$

$V_{max}$ means the maximum voltage reference, and $V_U^*$ is equal to $\tfrac{1}{2} \cdot V_{max}$ or less. Thus, in terms of absolute values, $V^{**}$ is less than or equal to $V_{max}$.

The ninth embodiment of the invention has the advantage of a particularly simple construction. Further, when the output frequency from the inverter is in the low level regime, the increase of the temperature of the switching elements, such as GTO thyristors, is fixed, and it is possible to control the output line voltage linearly.

The present invention is represented by a control block diagram of hardware for the sake of descriptive convenience. However, it is understood that the present invention can be implemented in software using a microcomputer or the like.

Furthermore, in the above embodiments, the present invention is applied to the inverter apparatus for converting DC power into AC power. However, as is well understood by those skilled in the art, the present invention is equally applicable to a converter apparatus for converting AC power into DC power.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A method of controlling an inverter generating a plurality of phase voltages and a corresponding plurality of line voltages defined as the differences between said phase voltages, said method comprising the steps of:

generating voltage reference signals having waveforms with three phases;

determining one of (1) a normal mode, (2) a rectangle mode and (3) a zero correction mode of operation of said inverter in response to values and polarities of said voltage reference signals; wherein:

the normal mode is determined when the amplitude of the waveform of all three phases of the voltage reference signals are over a preset value;

the rectangular mode is determined when at least one of the following conditions exist: (1) the amplitudes of the waveforms of at least two phases of the voltage reference signals are less than or equal to the preset value, and (2) the amplitudes of the waveforms of at least two phases of the voltage reference signals are less than or equal to twice the preset value and the signs of said at least two phases of the voltage reference signals are of different polarities with respect to each other; and the zero correction mode is determined when the amplitude of the waveform of one phase or the voltage reference signals is less than or equal to the preset value, and the amplitudes of the waveforms of the other two phases of the voltage reference signals are less than or equal to twice the present value and the other two phases have the same polarity;

using the voltage reference signals during the normal mode as a reference value for controlling said inverter; and in at least one of said determined rectangle and zero correction modes, converting the voltage reference signals to converted voltage reference signals in accordance with a preset algorithm such that each phase voltage based on said converted voltage reference signals has a controlled pulse width greater than or equal to a predetermined minimum width and such that the resulting line voltages do not change when compared to said line voltages generated using said voltage reference signals.

2. The method as recited in claim 1, wherein said converted voltage reference signals have phases corresponding to the phases of said voltage reference signals and wherein said step of converting said voltage reference signals to said converted voltage reference signals in said rectangle mode comprises the steps of:

selecting the waveform of the phase of said voltage reference signals which has the greatest absolute value, and fixing the amplitude of the waveform of the converted voltage reference signal corresponding to said selected phase to a predetermined value, $V_{min}$, where $V_{min}$ has the opposite sign as said selected phase, and adjusting the amplitude of the waveforms of the other phases of the converted voltage reference signals such that the resulting line voltages do not change when compared to said line voltages generated using said voltage reference signals.

3. The method as recited in claim 1, wherein said converted voltage reference signals have three waveforms with phases $V_U^{}$, $V_V^{}$, and $V_W^{**}$, corresponding respectively to three waveforms with phases $V_U^*$, $V_V^*$, and $V_W^*$ of said voltage reference signals and wherein said step of converting said voltage reference signals to said converted voltage reference signals in said rectangle mode comprises the steps of:

a) when the voltage reference signal with the phase $V_U^*$ has an amplitude which is the greatest of the three waveforms and is positive, setting the values of the corrected voltage reference signals according to the following relations:

$$V_U^{**} = -V_{min}$$

$$V_V^{**} = -V_{min} - (V_U^* - V_V^*)$$

$$V_W^{**} = -V_{min} - (V_U^* - V_W^*)$$

and when the voltage reference signal $V_U^*$ is the greatest of the three phases and is negative, setting the values of the corrected voltage reference signals according to the following relations:

$$V_U^{**} = V_{min}$$

$$V_V^{**} = V_{min} - (V_U^* - V_V^*)$$

$$V_W^{**} = V_{min} - (V_U^* - V_W^*)$$

where $V_{min}$ is a predetermined value.

4. The method as recited in claim 1, wherein said converted voltage reference signals have waveforms with phases $V_U^{}$, $V_V^{}$, and $V_W^{**}$, corresponding respectively to the waveforms with phases $V_U^*$, $V_V^*$, and $V_W^*$ of said voltage reference signals and wherein said step of converting said voltage reference signals to said converted voltage reference signals in said rectangle mode comprises the steps of:

a) when the voltage reference signal with the phase $V_U^*$ has an amplitude which is the greatest of the three waveforms and is positive, setting the values of the corrected voltage reference signals according to the following relations:

$$V_U^{**} = 0$$

$$V_V^{**} = -V_{min} - (V_U^* - V_V^*)$$

$$V_W^{**} = -V_{min} - (V_U^* - V_W^*)$$

and when the voltage reference signal with the phase $V_U^*$ has an amplitude which is the greatest of the three waveforms and is negative, setting the values of the corrected voltage reference signals according to the following relations:

$$V_U^{**} = 0$$

$$V_V^{**} = V_{min} - (V_U^* - V_V^*)$$

$$V_W^{**} = V_{min} - (V_U^* - V_W^*)$$

where $V_{min}$ is a predetermined value.

5. A method of controlling an inverter generating a plurality of phase voltages and a corresponding plurality of line voltages defined as the differences between said phase voltages, comprising the steps of:

a) generating voltage references signals having a plurality of waveforms, each waveform having a different phase;

b) selecting the waveform of the voltage reference signal which has the most positive value during a preset interval;

c) converting said selected waveform to a waveform of a converted voltage reference signal which has one of (1) a preset minimum value which is negative and (2) a preset value which is zero;

d) converting the other waveforms of said voltage reference signals to converted voltage reference signals of said inverter such that the resulting line voltages do not change when compared to said line voltages generated using said voltage reference signals;

e) selecting the waveform of the voltage reference signal which has the most negative value during said preset interval;

f) converting said selected waveform to a waveform of a converted voltage reference signal which has one of (1) a preset minimum value which is positive and (2) a preset value which is zero;

g) converting the other waveforms of said voltage reference signals to converted voltage reference signals of said inverter such that the resulting line voltages do not change when compared to said line voltages generated using said voltage reference signals; and h) switching alternately between steps b)–d) and steps e)–g) to control said inverter.

6. An inverter control apparatus for an inverter generating a plurality of phase voltages and a corresponding plurality of line voltages defined as the differences between said phase voltages, comprising:

a) mode decision means for determining one of (1) a normal mode, (2) a rectangle mode and (3) a zero correction mode in response to values and polarities of voltage reference signals having waveforms with three phases; wherein:

said mode decision means comprises means for determining the normal mode when the amplitude of the waveforms of all three phases of the voltage reference signals are over a preset value;

means for determining the rectangle mode when at least one of the following conditions exist: (1) the amplitudes of the waveforms of at least two phases of the voltage reference signals are less than or equal to the preset value, and (2) the amplitudes of the waveforms of at least two phases of the voltage reference signals are less than or equal to twice the preset value and the signs of said at least two phases of the voltage reference signals are of different polarities with respect to each other; and the means for determining the zero correction mode when the amplitude of the waveform of one phase of the voltage reference signals is less than or equal to the preset value, and the amplitudes of the waveforms of the other two phases of the voltage reference signals are less than or equal to twice the preset value and the other two phases have the same polarity; and b) voltage reference conversion means:

1) operative in said normal mode for outputting the voltage reference signals as converted voltage reference signals which are identical to said voltage reference signals; and 2) operative in said rectangle and zero correction modes for outputting corrected voltage references signals in response to said voltage reference signals in accordance with an algorithm such that the resulting line voltages do not change when compared to said line voltages generated using said voltage reference signals.

7. The inverter control apparatus as recited in claim 6, wherein said inverter is a neutral point clamped inverter which outputs three phase voltages and wherein, in said rectangle mode, said voltage reference conversion means is operative to fix one phase of said corrected voltage reference signals to a zero value.

8. An inverter control apparatus for controlling a neutral point clamped three-phase inverter having switching elements and generating a plurality of phase voltages and a corresponding plurality of line voltages comprising:

means for generating voltage reference signals having plural phases;

voltage reference conversion means for:

(1) converting said voltage reference signals to converted voltage reference signals, said conversion means fixing the value of one of a converted voltage reference signal to one of a positive minimum value or a negative minimum value when the width of any of said plurality of phase voltages becomes equal to a minimum value corresponding to a minimum ON pulse width of the switching elements; and (2) converting the other of said voltage references signals to other converted voltage reference signals such that the resulting line voltages do not change when compared to said line voltages generated using said voltage reference signals.

9. An inverter control apparatus for controlling a neutral point clamped three-phase inverter, said inverter generating a plurality of phase voltages and a corresponding plurality of line voltages comprising:

means for generating voltage reference signals having plural phases;

first voltage reference conversion means for converting all phases of said voltage reference signals to converted voltage reference signals, all having a positive polarity, such that the resulting line voltages generated from said converted voltage reference signals do not change when compared to said line voltages generated using said voltage reference signals;

second voltage reference conversion means for converting all phases of said voltage reference signals to converted voltage reference signals, all having a negative polarity, such that the resulting line voltages generated from said converted voltage reference signals do not change when compared to said line voltages generated using said voltage reference signals; and switching means for alternately controlling said inverter using said first and second voltage reference conversion means.

10. An inverter control apparatus for controlling a neutral point clamped three-phase inverter, said inverter generating three phase voltages and three corresponding line voltages, comprising:

first voltage reference conversion means for converting two phases of said voltage reference signals to converted voltage reference signals, each having a positive polarity, and for converting the other phase of said voltage reference signal to a converted voltage reference signal of a zero value, said conversion means operative such that the resulting line voltages generated from said converted voltage reference signals do not change when compared to line voltages generated using said voltage reference signals;

second voltage reference conversion means for converting two phases of said voltage reference signals to converted voltage reference signals, each having a negative polarity, and for converting the other phase of said voltage reference signal to a converted voltage reference signal of a zero value, said conversion means operative such that the resulting line voltages generated from said converted voltage reference signals do not change when compared to line voltages generated using said voltage reference signals; and switching means for alternately controlling said inverter using said first and second voltage reference conversion means.

11. An inverter control apparatus for controlling a neutral point clamped three-phase inverter, said inverter generating three phase voltages and a three corresponding line voltages, comprising:
- a) a generator which generates voltage reference signals having a plurality of waveforms each having a different phase;
- b) means for selecting the phase of the voltage reference signal which has the most positive value waveform during a preset interval;
- c) means for converting said selected phase to a phase of a converted voltage reference signal which has a preset positive maximum value waveform;
- d) means for converting the other phases of said voltage reference signals to converted voltage reference signals of said inverter such that the resulting line voltages do not change when compared to said line voltages generated using said voltage reference signals;
- e) means for selecting the phase of the voltage reference signal which has the most negative value waveform during said preset interval;
- f) means for converting said selected phase to a phase of a converted voltage reference signal which has a preset negative maximum value waveform;
- g) means for converting the other phases of said voltage reference signals to converted voltage reference signals of said inverter such that the resulting line voltages do not change when compared to said line voltages generated using said voltage reference signals; and
- h) means for switching alternately between activation of elements b)–d) and elements e)–g) to control said inverter.

* * * * *